United States Patent [19]

Nobusawa

[11] 4,074,289
[45] Feb. 14, 1978

[54] CAMERA EXPOSURE CONTROL SYSTEM ADAPTER TO ADJUST BOTH THE DIAPHRAGM AND THE SHUTTER

[75] Inventor: Tsukumo Nobusawa, Tokyo, Japan

[73] Assignee: Asahi Kogaku Kogyo Kabushiki Kaisha, Japan

[21] Appl. No.: 595,805

[22] Filed: July 14, 1975

[30] Foreign Application Priority Data

July 17, 1974 Japan .................................. 49-81211
Aug. 2, 1974 Japan .................................. 49-88099
Oct. 3, 1974 Japan .................................. 49-114014
Nov. 5, 1974 Japan .................................. 49-126557

[51] Int. Cl.² .............................................. G03D 7/08
[52] U.S. Cl. .................................. 354/23 D; 354/29; 354/43; 354/44; 354/50; 354/51; 354/60 A
[58] Field of Search ................... 354/23 D, 26, 40, 50, 354/51, 60 R, 60 A, 43, 44, 29

[56] References Cited

U.S. PATENT DOCUMENTS

| | | | |
|---|---|---|---|
| 3,879,118 | 4/1975 | Kiyohara et al. | 354/23 D |
| 3,900,855 | 8/1975 | Stempeck | 354/23 D |
| 3,903,528 | 9/1975 | Kee | 354/23 D |
| 3,928,858 | 12/1975 | Sakurada et al. | 354/23 D |
| 3,969,735 | 7/1976 | Nobusawa | 354/43 |

FOREIGN PATENT DOCUMENTS 2,319,167 10/1974 Germany ........................... 354/23 D

OTHER PUBLICATIONS

Data Sheet, Parallel Processing System, Microelectronic Device Division, Rockwell International.

*Primary Examiner*—Russell E. Adams
*Attorney, Agent, or Firm*—Christie, Parker & Hale

[57] ABSTRACT

This invention provides for automatically adjusting the diaphragm opening in a camera having a shutter operated in an automatic manner for controlling exposure time, so as to counteract such problems as the exposure time being adjusted to the point within its adjustability range at which slight hand movements result in a blurred photograph. A camera embodying the invention includes diaphragm driving circuitry responsive to a drive control signal, such as a sequence of drive pulses, supplied thereto, and a digital circuit arrangement for selectively applying the drive control signal to cause the diaphragm opening to be adjusted from a manual presetting thereof to a setting that, under prevailing lighting conditions, is consistent with an acceptable range of exposure times.

23 Claims, 30 Drawing Figures

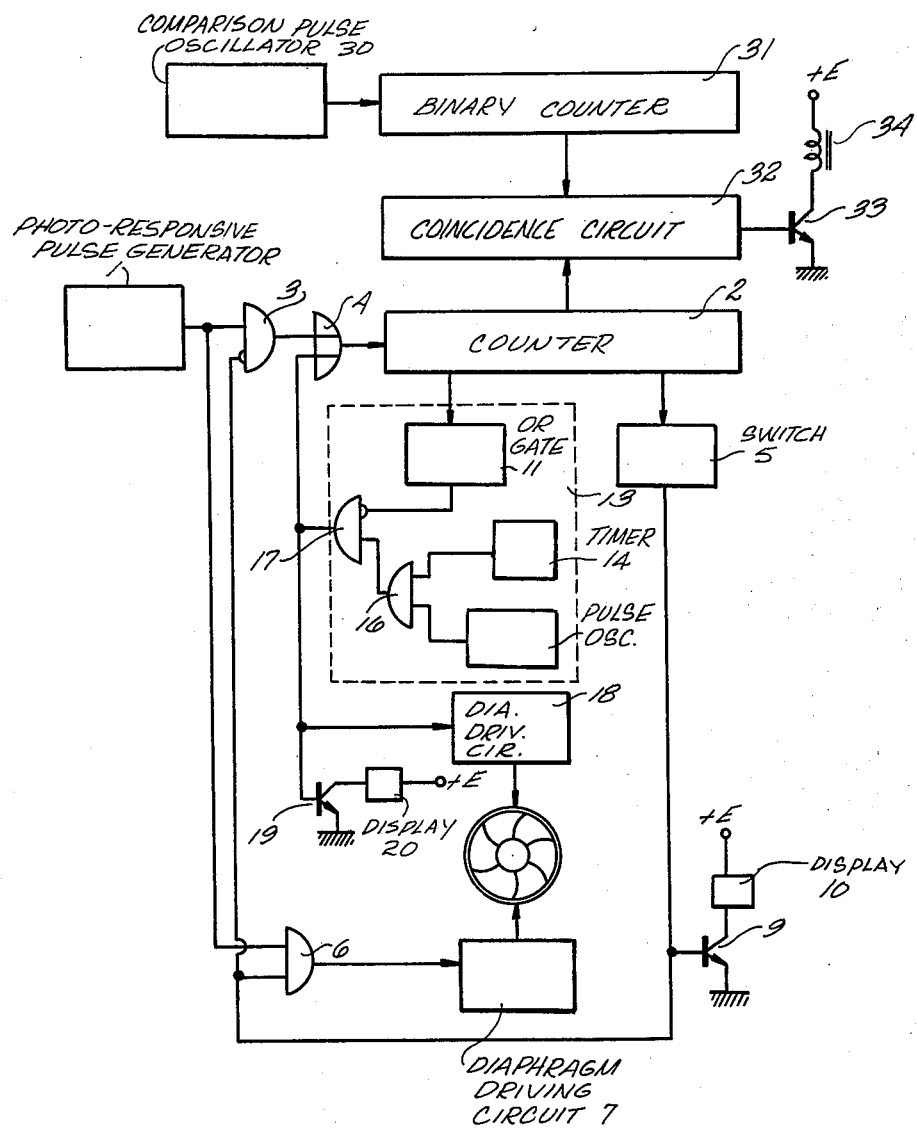

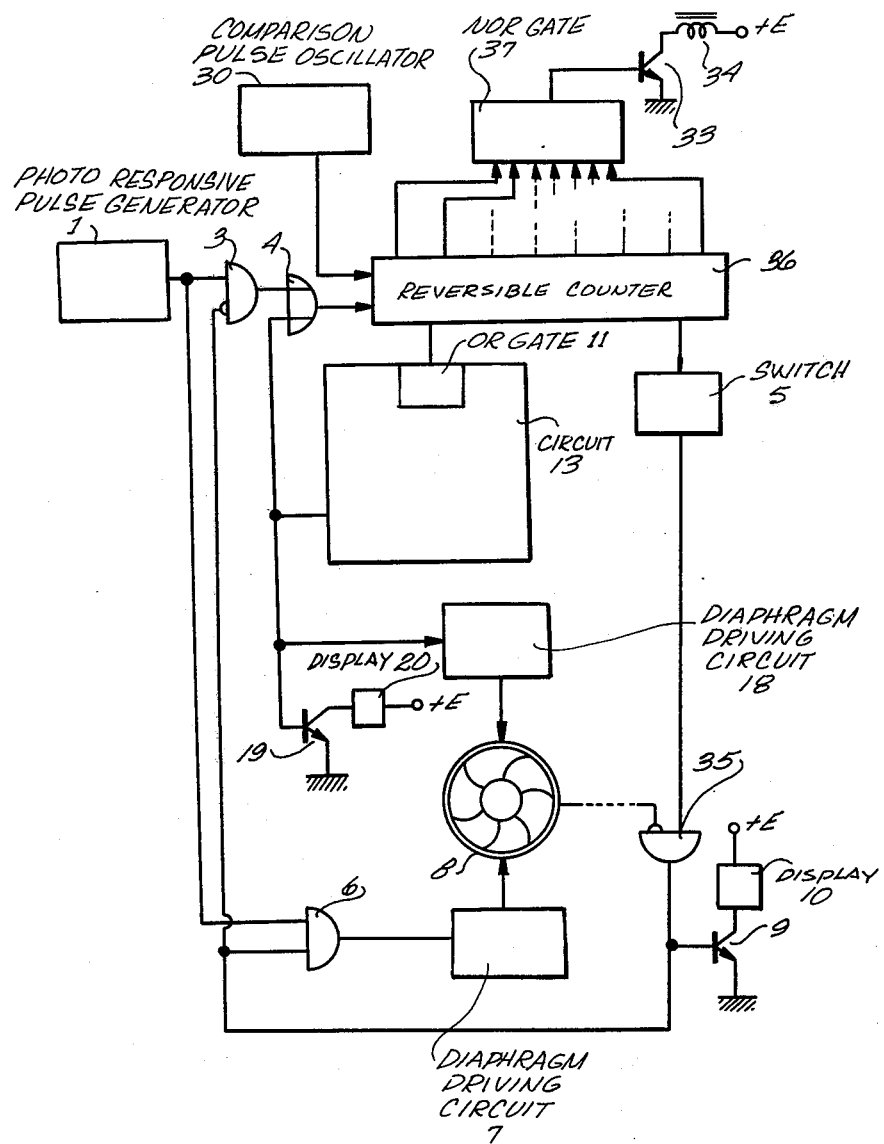

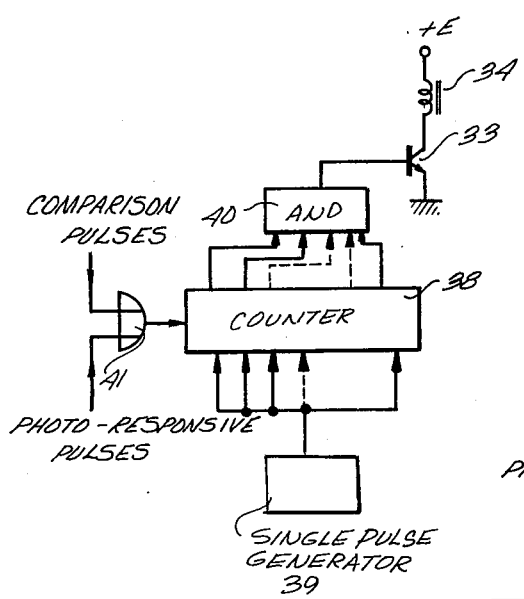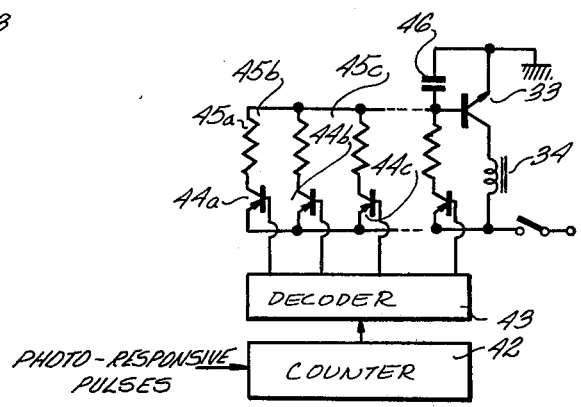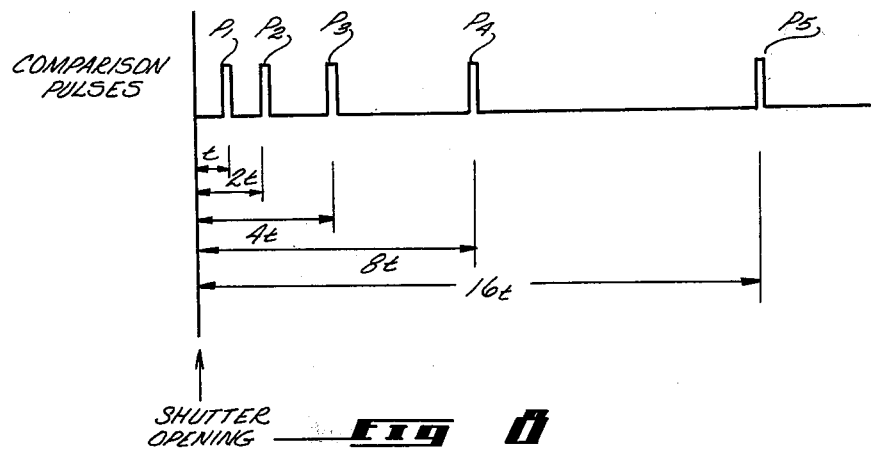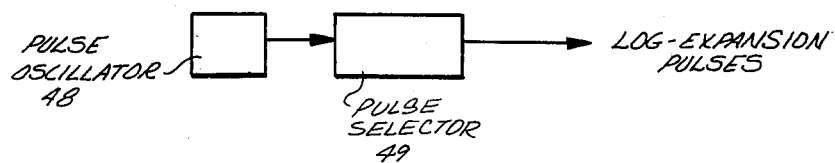

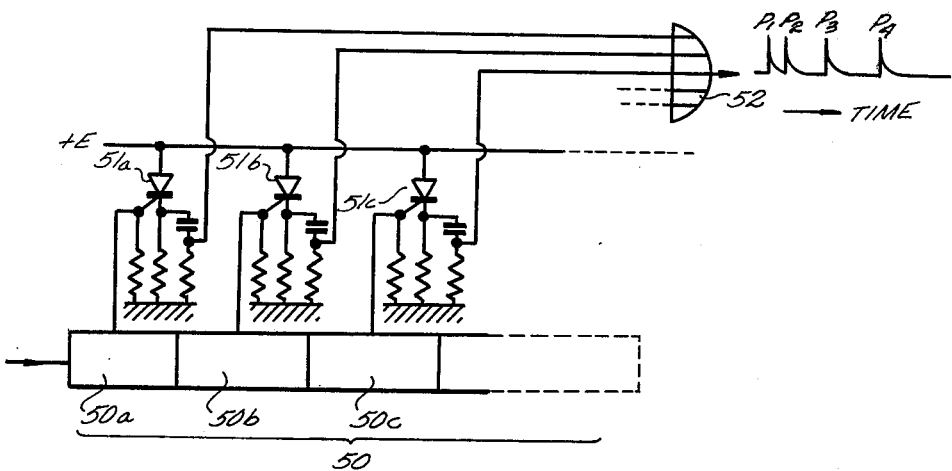
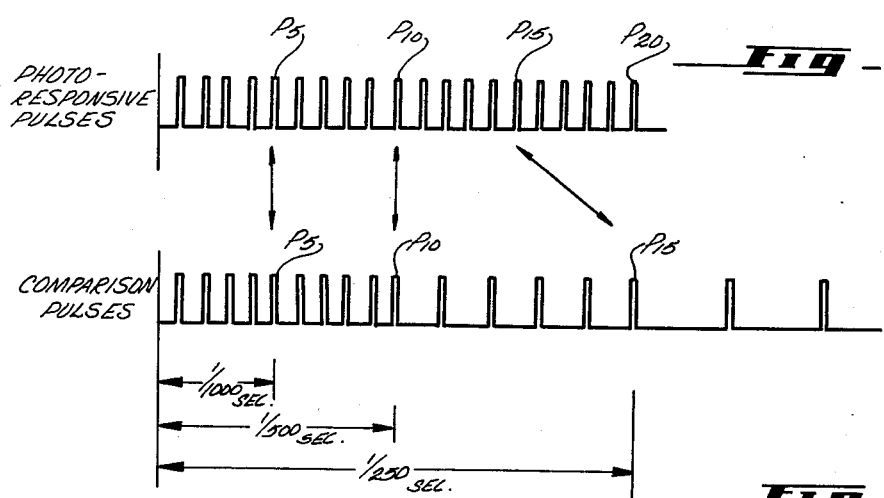
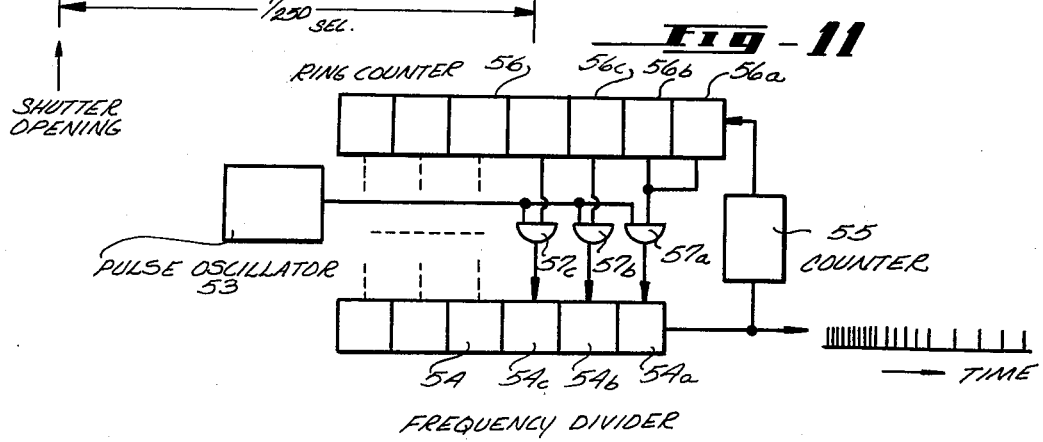

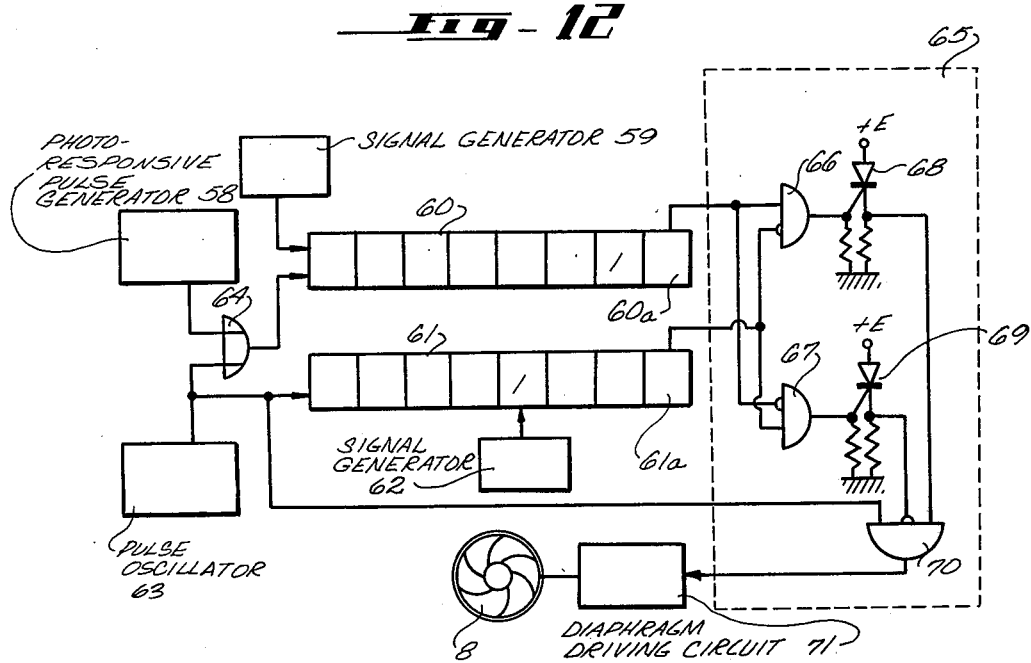
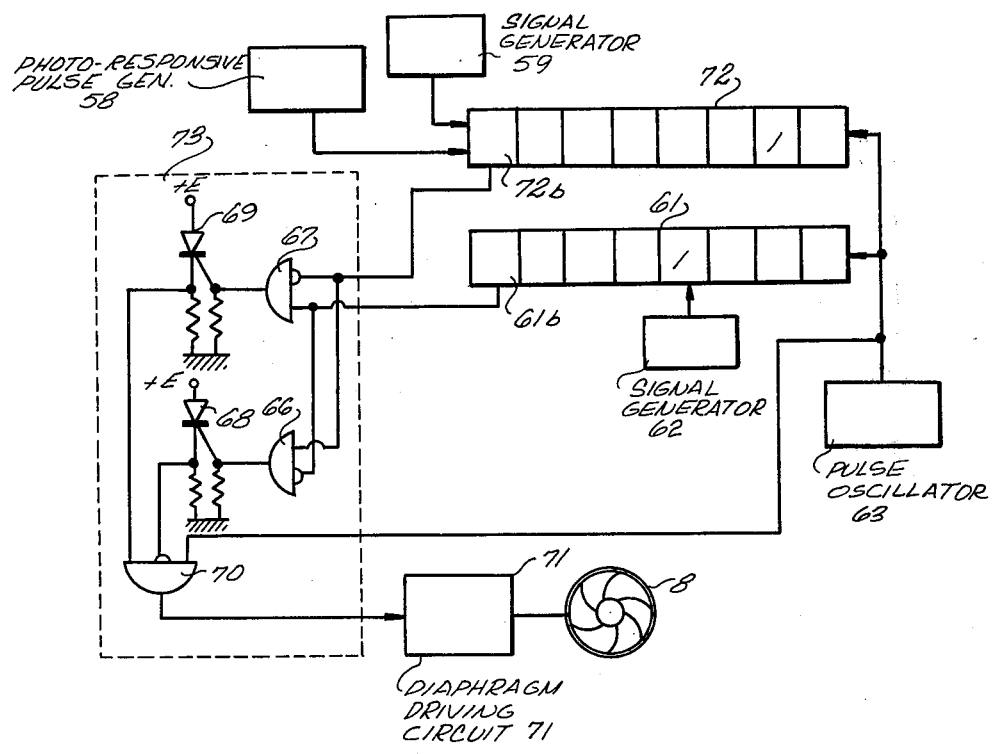

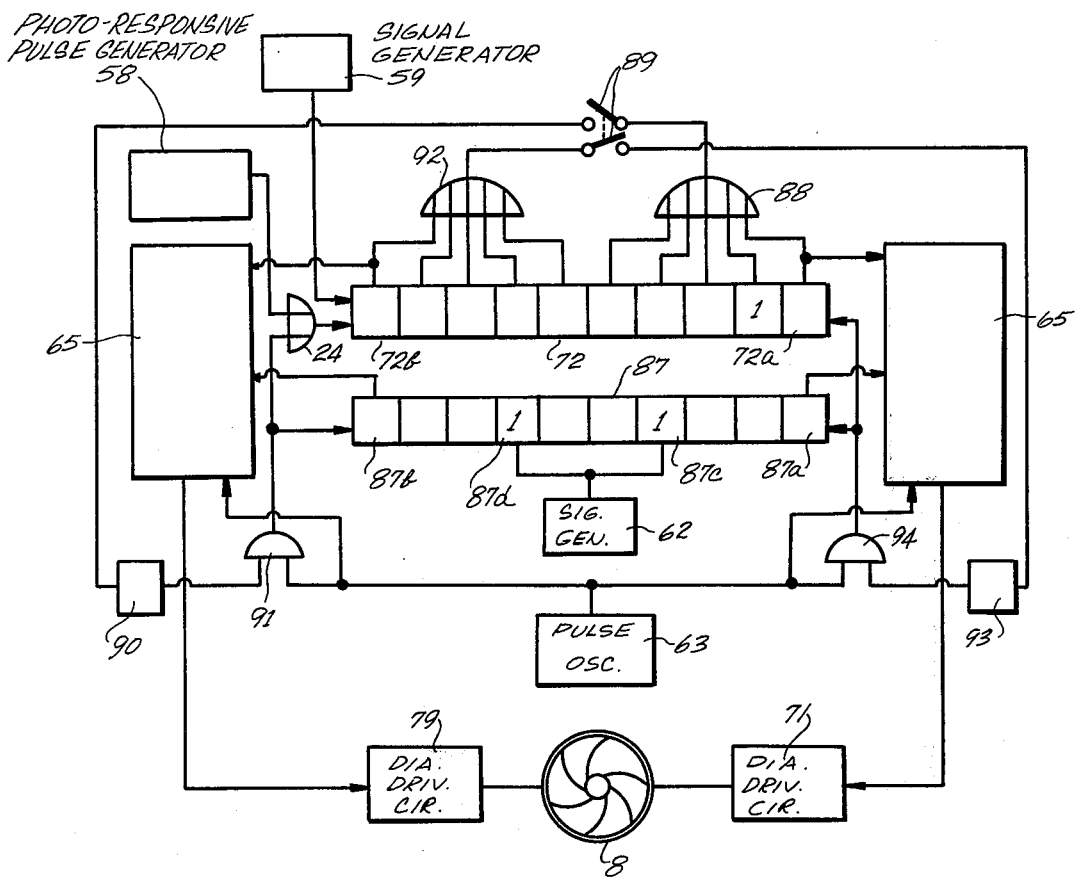

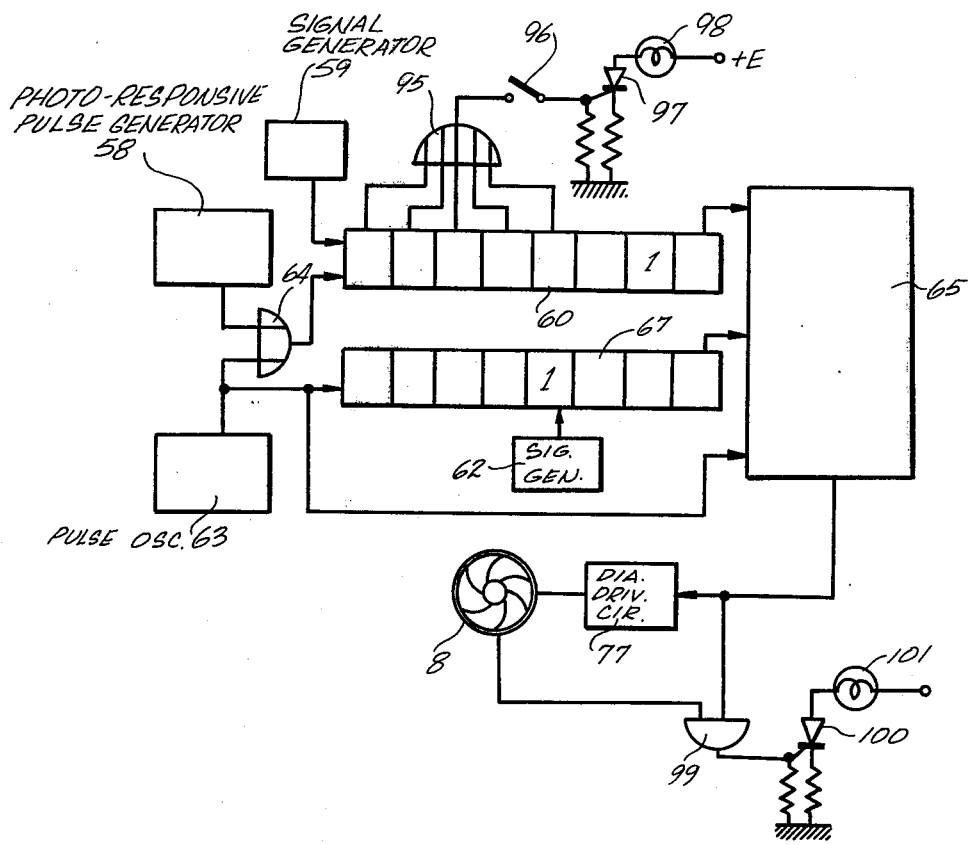

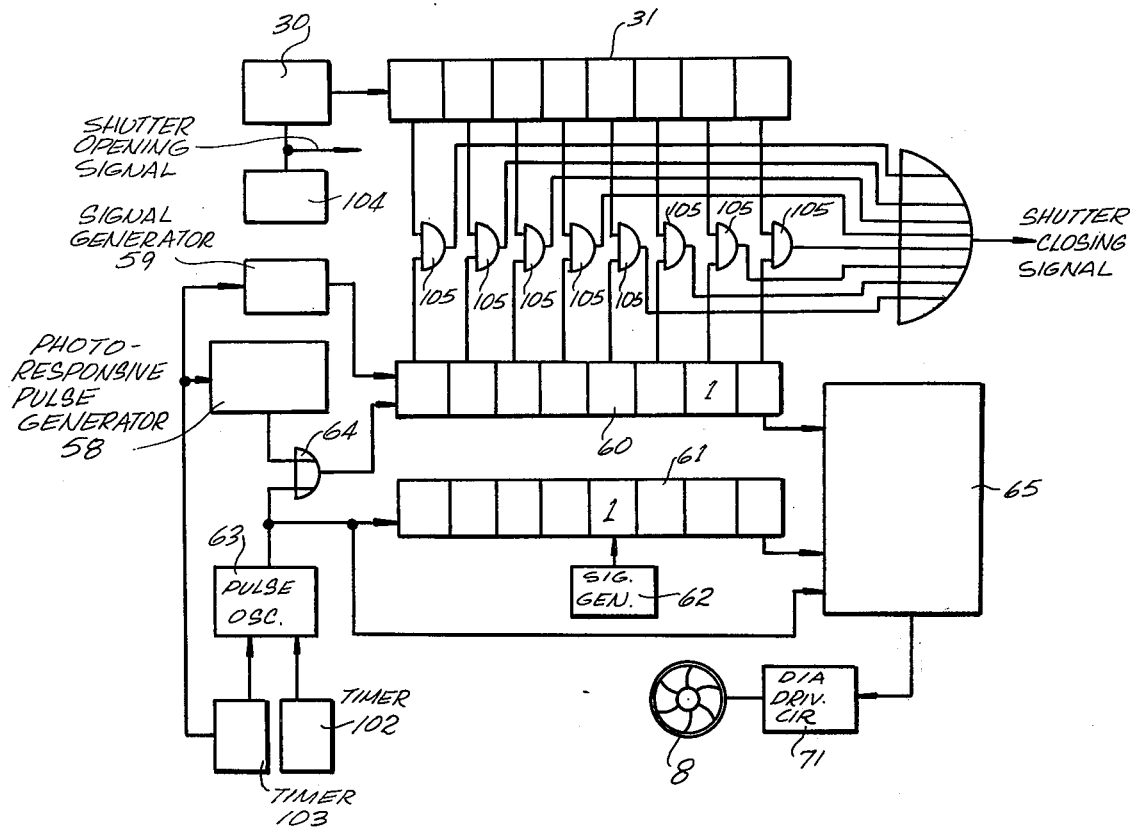
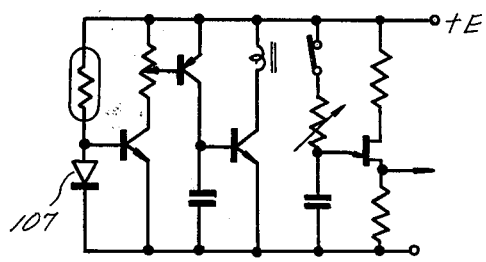

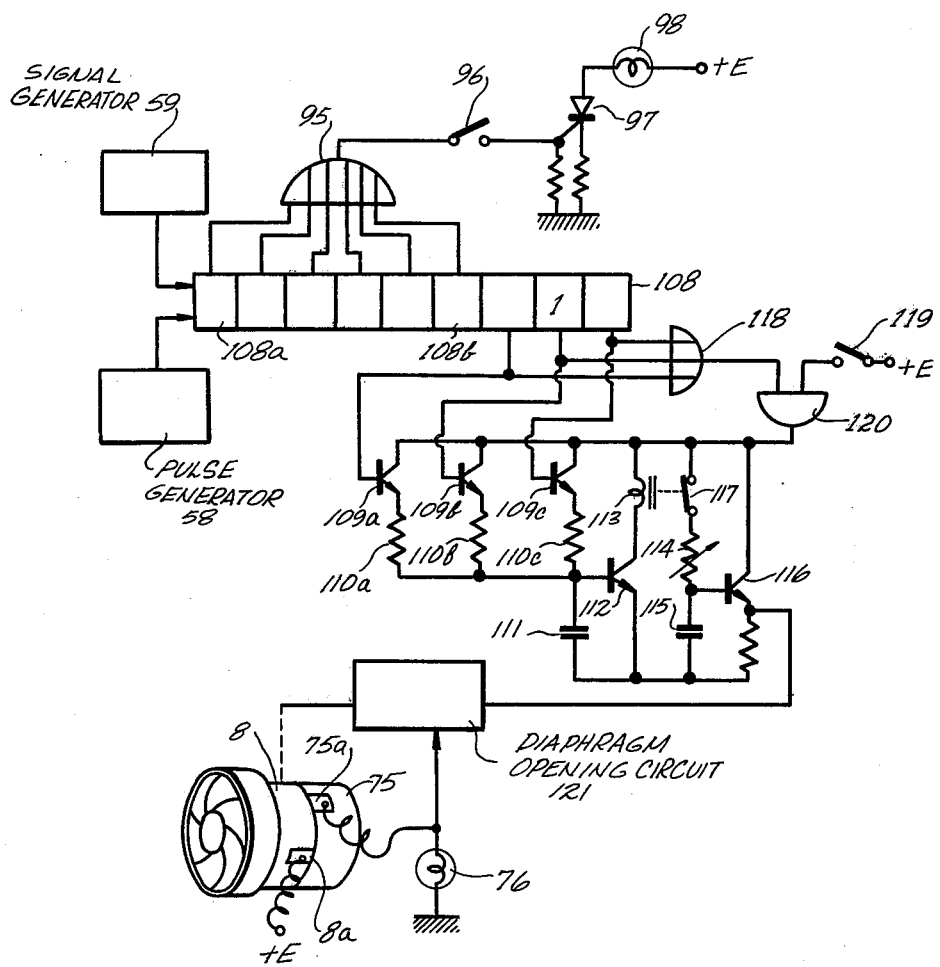

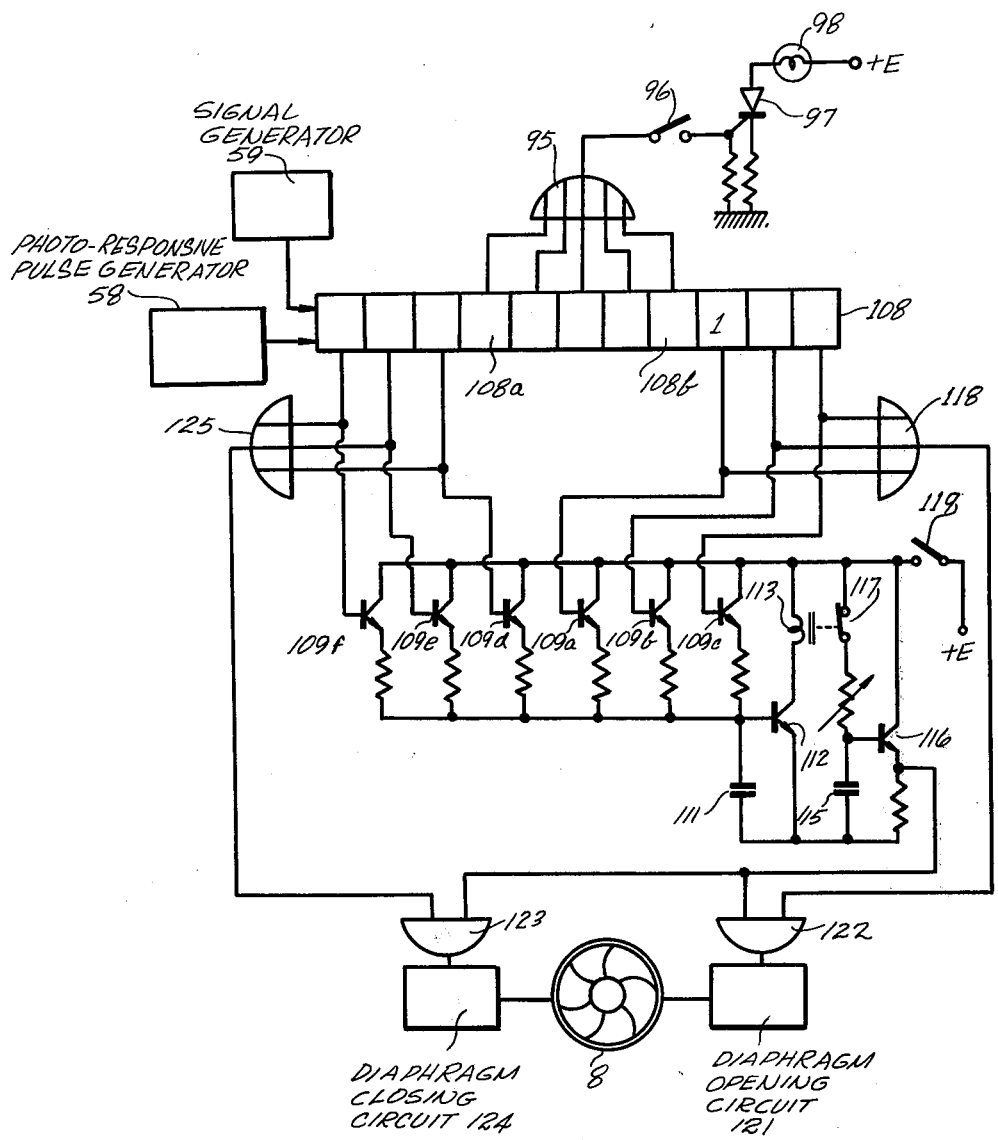

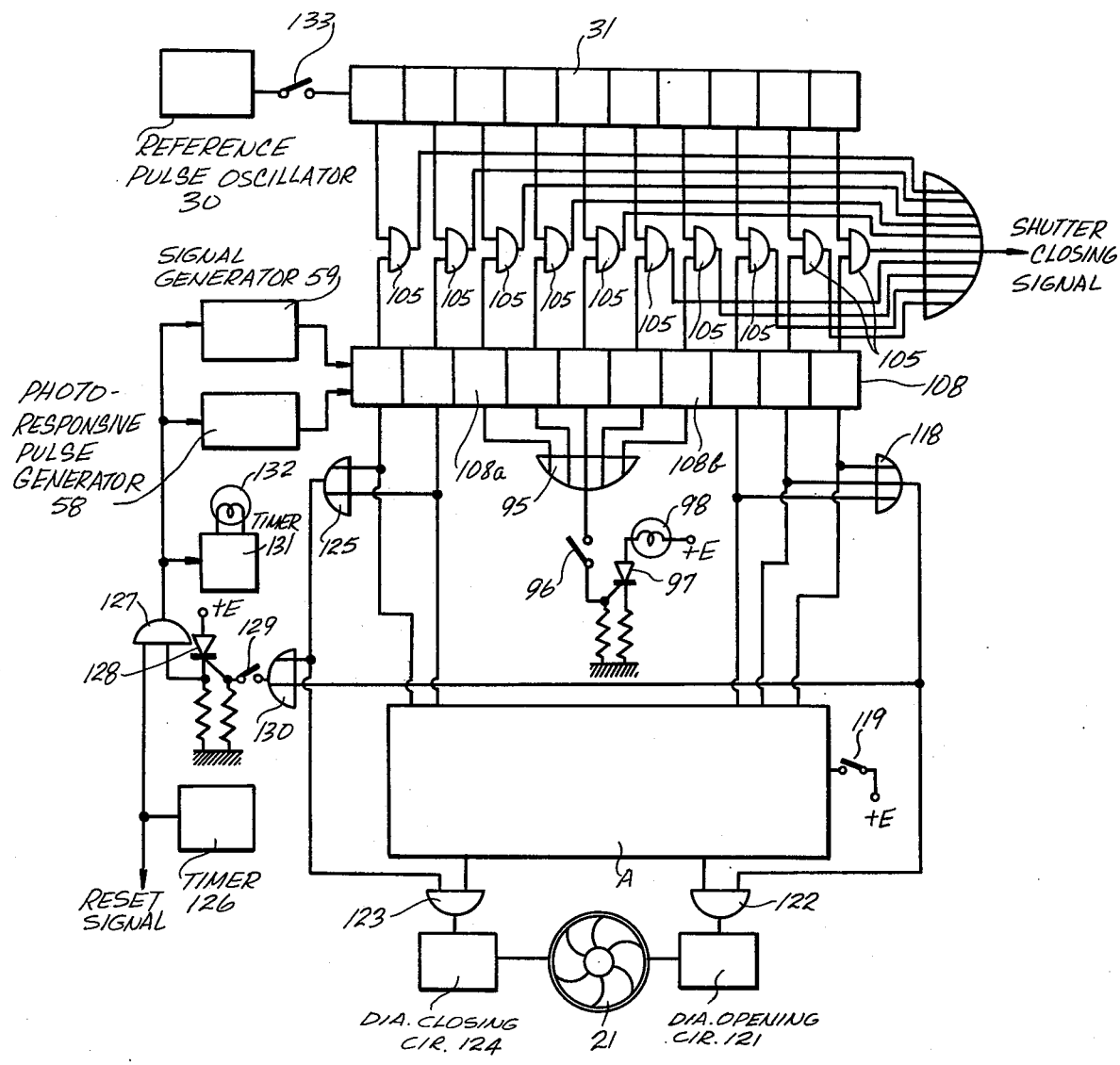

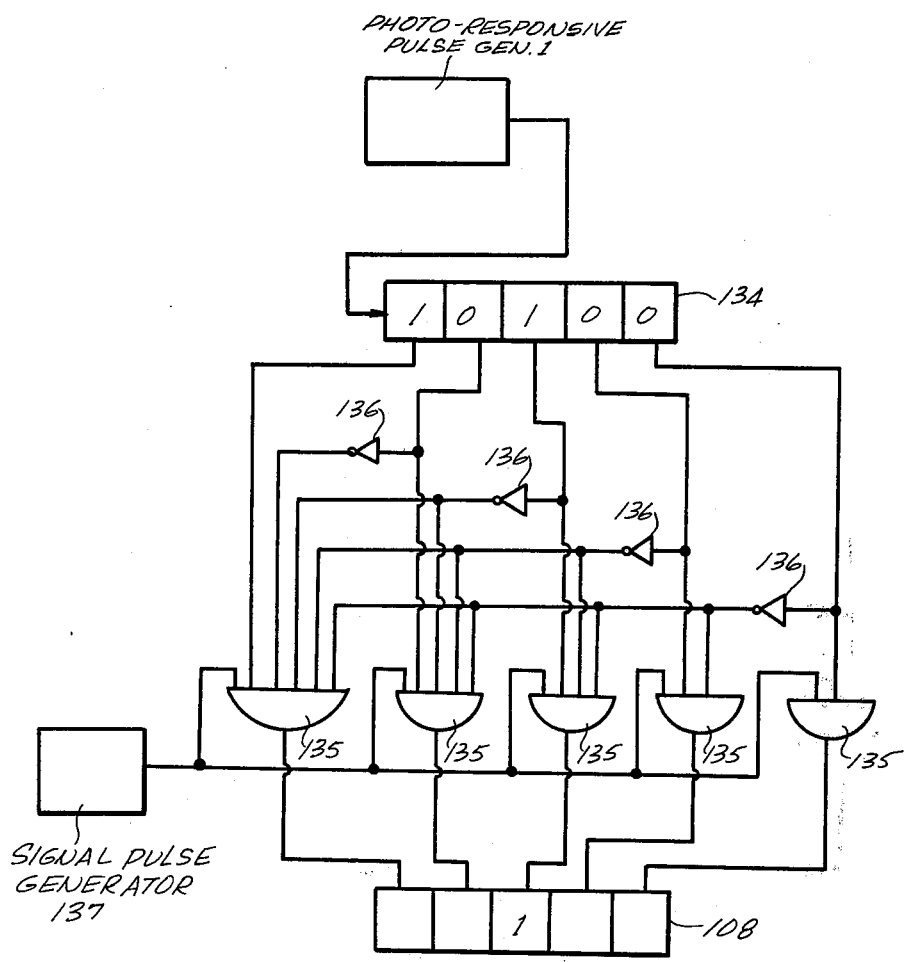

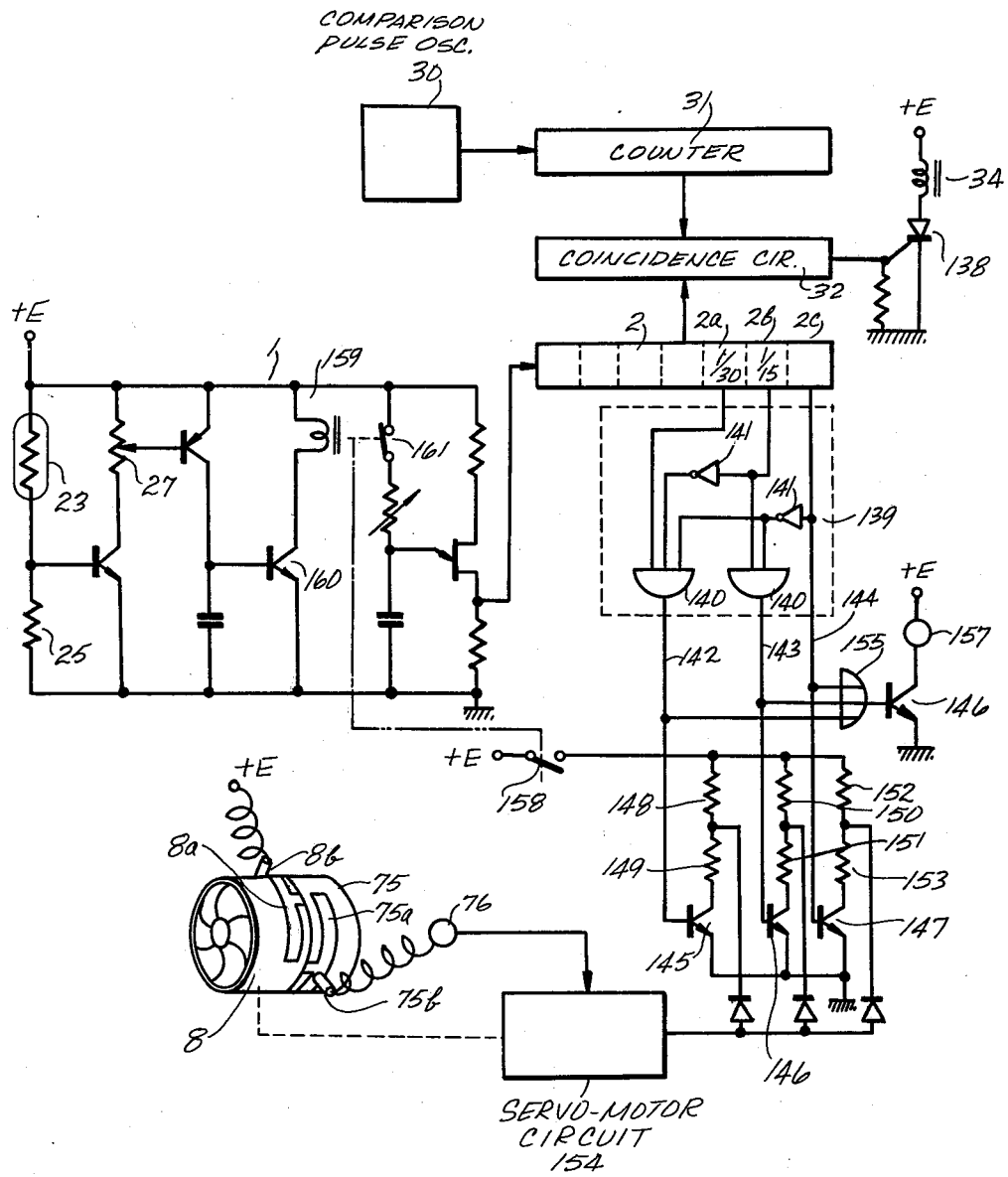

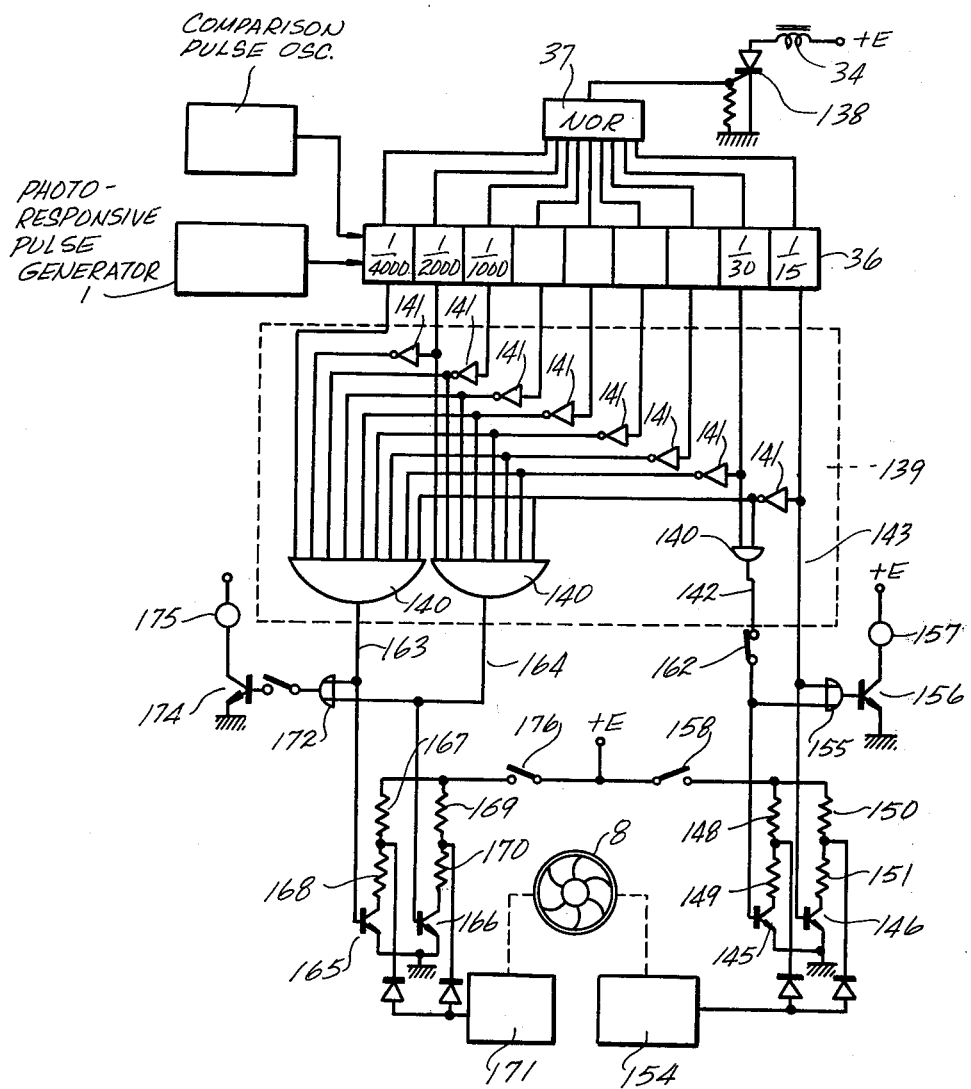

CAMERA EXPOSURE CONTROL SYSTEM ADAPTER TO ADJUST BOTH THE DIAPHRAGM AND THE SHUTTER

BACKGROUND OF THE INVENTION

In general, this invention relates to camera exposure control systems. More particularly, it relates to such a control system for automatically changing the setting of a diaphragm opening from a manual presetting thereof in a camera having a shutter operating in an automatic manner for controlling exposure time.

It is a well known principle of photography that a plurality of different combinations of shutter speed and aperture setting result in the same amount of light impinging on the film. For example, the combination of an exposure time of 1/30th of a second and an aperture setting of $f4$ results in the same amount of light impinging on the film as the combination of an exposure time of 1/60th of a second and an aperture setting of $f2.8$. The foregoing example is a specific case of the general rule that total exposure is a function of the product of the two variables, light intensity and exposure time. Thus, a geometric increase in one of these variables, such as doubling, accompanied by a corresponding geometric decrease in the other variable, such as halving, has no effect on the total amount of light impinging on the film.

The foregoing does not mean that the resulting photographs taken with two such combinations will in all respects be the same. To the contrary, there can be significant differences between them. Firstly, the depth of field is affected by the aperture. In particular, objects in the foreground of a scene which will be acceptably in focus when a relatively small aperture is used will be out of focus when a relatively large aperture is used. Secondly, movements, either of objects in the scene or of the camera, have different effects depending upon the shutter speed used. In particular, it is generally true that a photographer while hand-holding a camera will inadvertently move it such that exposure time as prolonged as about 1/30th of a second result in blurred photographs. Another factor relevant here is that the recently developed fast electric shutters for expensive cameras have a maximum shutter speed, this typically being 1/1000th of a second. Circumstances arise in which this presents a problem. For example, a photographer may be taking a picture of a very brightly lighted scene with a manually preset aperture at $f2$. In these kinds of circumstances, the shutter speed necessary to prevent overexposure may exceed the maximum end of the adjustability range of the shutter speed.

A number of prior art approaches have been directed to these problems but have not provided a satisfactory solution. Generally, these prior art approaches are characterized by means for providing a warning indication to the photographer. According to one such prior art approach a display member visible through the viewfinder is lighted under circumstances in which the scene is so bright as to result in overexposure with the particular preset aperture even with the shutter speed being at the fastest speed in the range. A warning of a similar nature is sometimes given by locking the shutter release. Other circumstances in which such a warning has been given include the situation in which the scene is so dimly lighted that, with the particular preset aperture, the exposure time necessary to afford adequate exposure exceeds the threshold at which hand trembling will likely blur the resulting photograph. These warning systems are unsatisfactory for a number of reasons. First of all, the photographer must notice the warning and then take corrective steps by manually adjusting the lens aperture. This of course is bothersome and time consuming. Owing to the delay incident to doing this, it is possible that the photographer may miss the picture he wanted to take.

SUMMARY OF THE INVENTION

This invention provides for automatically changing the setting of the diaphragm opening from a manual presetting thereof in a camera having a shutter operated in an automatic manner for controlling exposure time, so as to counteract the above-described problems.

According to the invention, photo-responsive pulse generator means produce in serial-by-bit format a number of data pulses as a function of the light intensity of the object to be photographed and the manual presetting of the diaphragm. As is set forth in detail below in connection with the description of various embodiments of the invention, the serial-by-bit format can be such that the number of data pulses can be in a linearly proportional functional relationship with exposure time. For example, with only a single pulse being produced this can correspond to an exposure time of 1/2000th of a second; two such pulses can correspond to an exposure time of 1/1000th of a second, and so forth whereby, for example, sixteen such pulses correspond to 1/125th of a second. Alternatively, the serial-by-bit format can be such that the number of data pulses is in a reciprocal or inverse functional relationship with exposure time. As another alternative the serial-by-bit format can be such that the number of data pulses is in a logarithmic functional relationship with exposure time. That is, each such data pulse can correspond to a unit value change on a light value scale so that each such data pulse represents a signal to admit twice as much light to expose the film.

Further according to the invention, register means are provided for storing in parallel-by-bit format a digital signal to identify one of a sequence of memory states. Suitable such register means include binary-counting registers and shift registers. In one specific embodiment employing a binary counter, there are 8 counting stages provided so that the counter can be sequenced through 256 possible states. In another specific embodiment employing a shift register, only one stage of the shift register at a time is in its set condition whereby the different states of the shift register are distinguishable from each other on the basis of which stage is in the set condition.

There is further provided means responsive to the serially produced data pulses for sequencing the register means through its memory states so that a first predetermined number of the data pulses are required to sequence the register means to a first predetermined one of its memory states and a second, larger number of said data pulses are required to sequence the register means to a second predetermined one of said memory states. Thus, one specific embodiment employs a binary counter for counting data pulses in the format such that the number of data pulses is linearly proportional to exposure time. Here, one data pulse must be counted in order to sequence the counter from a completely reset state to a state corresponding to an exposure time of 1/2000th of a second, and 32 data pulses must be counted in order to sequence the counter to another state which corresponds to an exposure time of approximately 1/60th of a second.

A significant feature of the invention resides in the provision of diaphragm driving circuit means for adjusting the diaphragm opening in response to a drive control signal supplied thereto. Additionally, there is provided means responsive to the parallel-by-bit digital signal for supplying the drive control signal to the diaphragm driving circuit means to cause it to adjust the diaphragm opening in accordance with the difference between the number of such serially produced data pulses and one of the predetermined number of pulses.

The preferred features of the invention are best summarized in connection with the following separate general descriptions of the various embodiments of this invention.

A first arrangement according to the present invention includes a photo-responsive pulse generator adapted to produce data pulses by the number (i.e., in the serial-by-bit format) depending upon light intensity of an object to be photographed; a counter circuit adapted to count the number of pulses coupled to it from said photo-responsive pulse generator; and diaphragm driving circuit means comprising two separate circuits, one for controlling the opening of the diaphragm and another for controlling the closing of the diaphragm. In operation, when the number of data pulses produced by said photo-responsive pulse generator exceeds a maximum value predetermined for said counter circuit, gating means are enabled so that the portion of pulses that is in excess of said maximum value is applied to the first diaphragm driving circuit instead of being applied to said counter circuit; and wherein when said number of data pulses is fewer than a minimum value predetermined for said counter circuit, there is additionally generated and applied to the second diaphragm driving circuit a number of drive pulses equal to the difference between the number of data pulses and said minimum value. In such an embodiment, the diaphragm is either opened or closed and in an amount depending upon the number of pulses applied to the diaphragm driving circuit means.

A second arrangement according to the present invention includes a photo-responsive pulse generator adapted to apply pulses by the number depending upon light intensity of an object to be photographed, a first shift register adapted to store a signal therein at a position depending upon the number of pulses applied from said photo-responsive pulse generator, a second shift register adapted to store a signal therein at a reference position, a pulse oscillator adapted to generate additional shift pulses to be applied to said two shift registers after the signals have been stored in said two shift registers, a detector adapted to detect the sequence and the interval in and at which the signals contained in said two shift registers respectively, reach the associated given positions in the respective shift registers under the effect of said additional shift pulses and to apply pulses by the number depending upon the result of detection and a diaphragm driving circuit adapted to adjust the diaphragm in accordance with the number of pulses applied from said detector.

A third arrangement according to the present invention includes a photo-responsive pulse generator adapted to apply pulses by the number depending upon light intensity of an object to be photographed, a counter circuit adapted to count the number of pulses applied from said pulse generator, a timer circuit adapted to give a particular time, depending upon a counting value of said counter circuit when this value deviates from a certain range and a diaphragm driving circuit adapted to adjust the diaphragm in accordance with a drive control signal supplied thereto. In this embodiment, the timer circuit controls the length of time during which the drive control signal is supplied.

One of the advantages of this invention resides in the dual role the register means is adapted to play. In particular, prior designs for cameras of various types provide for an electric shutter, a photo-responsive pulse generator, and a counter circuit adapted to count the number of pulses applied from said photo-responsive pulse generator, wherein the shutter time is automatically controlled according to the value counted by said counter circuit. Application of the present invention to such an electric shutter camera will be advantageous in that the same photo-responsive pulse generator and counter circuit used in the lens aperture adjustment may serve simultaneously in the exposure time adjustment of the electric shutter.

The electric shutter camera of such a type that a shutter time is digitally stored and the shutter time is automatically controlled according to the storage value has usually been arranged so that the number of pulses generated is inversely proportional to light intensity of an object to be photographed is stored in a counter circuit. Assuming that 100 pulses are generated for the light intensity of mLV, accordingly, 200 pulses are generated for the light intensity of $(m - 1)$LV and 400 pulses are generated for the light intensity of $(m - 2)$LV. Thus, the counting value is doubled for each unit change 1LV. To achieve highly precise shutter time control, the number of pulses for 1LV should be increased. Where the determination of whether a shutter time is acceptable or unacceptable is determined on the basis of a counting value of a single counter circuit which serves both the lens aperture adjusting device and the electric shutter itself, and where the lens aperture adjusted when the shutter time is determined unacceptable, the adjustment may be effectively achieved by a relatively coarse unit such as 1LV. Accordingly, the arrangement may be such that the digital output of the counter circuit is converted into a coarser digital output and the diaphragm driving circuit is activated according to the output thus converted.

One of the possible consequences of automatically opening the shutter rather than prolonging the exposure time is that the depth of field may be reduced to less than what the photographer may consider desirable under the circumstances. Accordingly, there may be provided an arrangement such that the operation of lens aperture adjustment is stopped when the lens aperture value reaches a predetermined value in the course of the lens aperture adjustment in said direction.

BRIEF DESCRIPTION OF THE DRAWINGS

FIGS. 3 and 4 are block and schematic diagrams illustrating a control system comprising the lens aperture adjusting device of FIG. 1 combined with an electric shutter;

FIGS. 5 and 6 illustrate another specific embodiment of the electric shutter circuit which may be combined with the lens aperture adjusting device according to the present invention;

FIG. 7 is a time chart showing an example of comparison pulse train;

FIG. 8 illustrates a specific embodiment of a comparison pulse oscillator;

FIG. 9 illustrates a specific embodiment of a pulse selector 49;

FIG. 10 is a time chart showing another example of comparison pulse train;

FIG. 11 illustrates a specific embodiment of the comparison pulse oscillator adapted to generate the comparison pulses of FIG. 10;

FIGS. 12 to 22 illustrate embodiments of the present invention in which two shift registers are employed to adjust the lens aperture, with FIGS. 17 to 19 particularly illustrating the signal storage condition in the embodiment of FIG. 20;

FIG. 23 illustrates an embodiment of the present invention comprising the embodiment of FIG. 12 combined with an electric shutter circuit;

FIG. 24 illustrates a specific embodiment of the photo-responsive pulse generator 58;

FIGS. 25 and 26 illustrate embodiments of the present invention in which a timer selects a time according to output of a counter and the lens aperture is adjusted in accordance with said time selected by said timer;

FIG. 27 illustrates an embodiment of the present invention comprising the embodiment of FIG. 26 combined with an electric shutter circuit;

FIG. 28 illustrates another means to store the signal in said shift register 108; and FIGS. 29 and 30 illustrate embodiments of the present invention in which a shutter time is controlled according to digital output from the counter, said digital output is converted into coarser digital output and the lens aperture is adjusted by this converted digital output.

DETAILED DESCRIPTION

Figure 1:
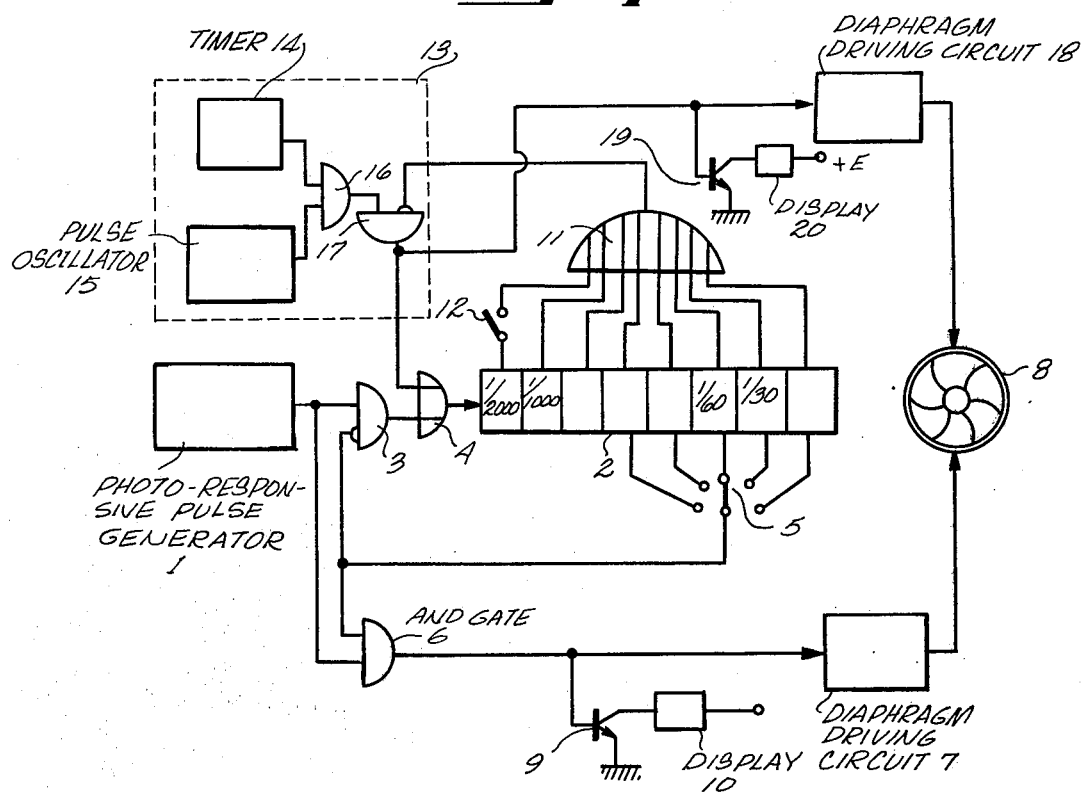
FIG. 1 is a block and schematic diagram illustrating a first embodiment of the present invention.

In FIG. 1 there is depicted in block form a photo-responsive pulse generator 1 that is provided for producing in serial-by-bit format a number of data pulses as a function of the light intensity of the object to be photographed and the manual presetting of the diaphragm opening. In this embodiment, there is an inverse or reciprocal functional relationship between, on the one hand, the number of data pulses in the serial-by-bit format and, on the other hand, the light intensity of the object to be photographed.

Figure 2:
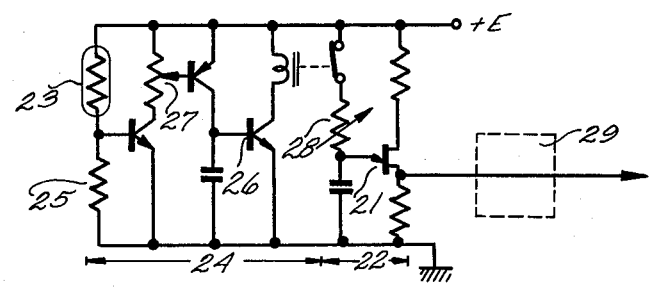
FIG. 2 is a schematic diagram illustrating a specific embodiment of a photo-responsive pulse generator shown in block form in FIG. 1.

A suitable photo-responsive pulse generator includes, as shown in more detail in FIG. 2, a pulse oscillator indicated generally at 22, and a timer circuit indicated at 24. The pulse oscillator 22 provides the data pulses at its output; it is of conventional construction and includes a unijunction transistor 21 and an RC timing network including an adjustable resistor 28.

The generator 1 as a whole is photo-responsive because of the provision of a CdS element 23 which serves as the photo electric element. As to its overall function, the timer circuit 24 controls the pulse oscillator 22 such that the number of data pulses produced decreases as a function of light intensity. The timer circuit 24 includes a switching transistor 26 that is controlled in accordance with the voltage applied across its base and emitter electrodes. When its base-emitter voltage reaches a threshold value, the switching transistor 26 turns on and in response a relay type switch is actuated so as to turn off the pulse oscillator 22. The time required for the base-emitter voltage to reach the threshold value is determined by the response of the CdS element 23 to the light impinging on it, a resistor 25 and a variable resistor 27 that is adjusted to a value in accordance with the presetting of the lens aperture. As to the adjustments to take account of different types of film being used, the variable resistor 28 is adjusted. As an alternative or supplementary means for reckoning the photographic parameters such as the lens aperture value, a frequency divider 29 may be provided to effect a frequency division of the output of the pulse generator 22.

With reference again to FIG. 1, the register means used in the embodiment depicted therein comprises a binary counter 2 having eight counting stages. Pulses are counted by the counter 2 upon being selectively coupled thereto by tandemly connected inhibition gate 3 and OR gate 4 which are responsive to the photo-responsive pulse generator 1. A switch 5 is provided to select a predetermined state or the maximum value for the binary counter 2 by connecting a selected bit stage of the binary counter 2 to the inhibition gate 3, and to an AND gate 6.

The system depicted in FIG. 1 includes diaphragm driving circuit means comprising a diaphragm driving circuit 7, which has drive pulses applied to it, these drive pulses serving as a drive control signal. The number of drive pulses depends upon the portion of data pulses produced by the photo responsive pulse generator 1 that is in excess of the predetermined value for the binary counter 2. In circumstances in which the number of data pulses exceeds this maximum value, the drive pulses are applied to the diaphragm driving circuit 7, and this causes the diaphragm driving circuit 7 to increase the camera lens diaphragm opening by a corresponding amount. Thus, the extent to which the diaphragm opening is increased depends upon the number of pulses contained in this excess portion. A suitable arrangement of the diaphragm driving circuit 7 includes a pulse-motor adapted to be directly driven by pulses, or a D-A converter (digital-analog converter) adapted to convert the number of pulses into a corresponding voltage, and another suitable element such as a servomotor, a meter or a rotary magnet adapted to be driven by the voltage. A switching transistor 9 also receives the excess portion of the pulses and in response activates a display member 10 such as a luminous diode or a lamp. This display member 10 is activated every time a pulse is applied to the diaphragm driving circuit 7 and, accordingly, it is possible to observe that the diaphragm 8 opening is being increased.

A multi-input OR gate 11, which may comprise a plurality of gates interconnected to provide an overall OR function, is responsive to the digital signal stored in the counter 2. In particular, it is connected to the respective bit stage outputs of the binary counter 2 (except the first bit stage), and the OR gate 11 provides a true output whenever two or more pulses are counted by the counter 2.

A switch 12 is used to select a predetermined minimum value for the counter 2. In particular, with the switch 12 being closed, the OR gate 11 provides a true output whenever even one pulse is counted by the counter 2. Therefore, the minimum value may be predetermined according to the number of inputs of the OR gate 11. Reference numeral 13 designates an electric circuit used to generate pulses by the number in the event that fewer data pulses than the predetermined minimum number are produced by the pulse generator 1. The circuit 13 comprises a timer 14, a pulse oscillator 15, and AND gate 16 adapted to pass pulses after activation of the timer 14, and an inhibition gate 17 adapted to pass pulses only when the OR gate 11 provides a false output.

The diaphragm driving circuit means of the system depicted in FIG. 1 also includes a diaphragm driving circuit 18, which receives drive pulses from the inhibition gate 17 and decreases the opening of the diaphragm 8 to an extent depending upon the number of drive pulses it receives. This diaphragm driving circuit 18 may have the same construction as the diaphragm driving circuit 7 previously described. A switching transistor 19 and a display member 20 are provided to give a visual indication that the diaphragm 8 is being adjusted by the driving circuit 18.

The manner in which this embodiment operates will now be described. Upon activation of the photo-responsive pulse generator 1 in operative association with a release button or a separate operating mechanism, data pulses are produced and initially gated to be applied to the binary counter 2. The number of such pulses depends upon the light intensity of the object to be photographed, the preset lens aperture, and film sensitivity. In the event that the number of data pulses exceeds the number corresponding to a shutter time of 1/60th of a second (which is the threshold value free from any influence of hand trembling), the counter 2 initially sequences through its counting states until the digital signal it stores corresponds to that shutter time. At the point at which the bit stage labeled 1/60 becomes true, the inhibition gate 3 blocks further coupling of the data pulses to the counter 2, and, simultaneously, AND gate 6 is activated to couple the portion of data pulses exceeding the predetermined maximum value to the diaphragm driving circuit 7 as drive pulses therefor. Now the diaphragm 8 is opened to the lens aperture value corresponding to the shutter time of 1/60th second.

On the other hand, in the event that fewer data pulses than the number of pulses corresponding to the highest shutter speed of 1/1000th of a second of this camera (2 pulses in this embodiment) have been produced, the OR gate 11 provides a false output. Upon activation of the timer 14 after a predetermined time has elapsed, the pulses from the pulse oscillator 15 are applied through the inhibition gate 17 until the OR gate 11 provides a true output. This portion of pulses that is short with respect to the minimum value (i.e., a number of pulses equal to the difference between the number of pulses that is required to sequence the counter to the minimum value and the actual number of pulses produced by the pulse generator 1) is applied also to the diaphragm driving circuit 18 and, as a result, diaphragm 18 is closed to the lens aperture value corresponding to the shutter time of 1/1000th second. The diaphragm 8 is not adjusted when the number of pulses applied from the photo-responsive pulse generator 1 is within the range defined between the predetermined minimum and maximum values.

Figure 15:
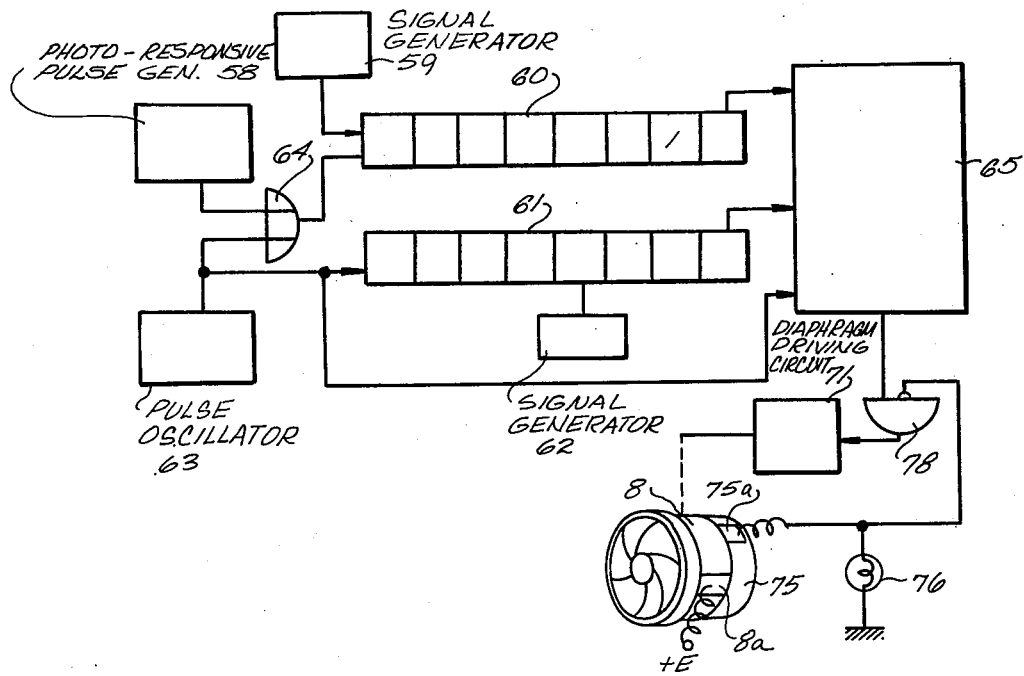

To safeguard against an undesirable reduction in depth of field the diaphragm 8 may be prevented from being further automatically opened beyond a preselected aperture size. To achieve this, as shown in FIG. 15, the diaphragm ring 8 is provided with a switch contact 8a. A ring 75 located adjacent to the diaphragm ring 8 provides for presetting a threshold value. The ring is also provided with a switch contact 75a so that these switch contacts are brought into contact with each other when the diaphragm ring 8 reaches the threshold value and the signal representing such a contact state causes a circuit including said switch 5, the inhibition gate 3 and the AND gate 6 to be intercepted. With such an arrangement, the diaphragm ring 8 is prevented from being further opened and a balance between the portion of pulses in excess of the maximum value and the number of pulses contained in said portion that has been required to open the diaphragm ring 8 to the threshold value is applied to the binary counter 2. Said timer 14 is adapted to be activated after counting of the binary counter 2 has been completed. Thus, this timer 14 is activated, in the embodiment as previously mentioned, after a sufficient time has elapsed to count the maximum number to be counted by the binary counter 2, namely, 255 pulses, since said previous embodiment includes the binary counter 2 containing eight bits. However, if a time which is set by the timer is constant even when the input pulses to be counted are fewer and the operation of counting completes correspondingly earlier, a time wasting would occur. This time loss may be avoided by an arrangement such that the operating signal from the timer 24, instead of the timer 14 is applied to the AND gate 16 with the photo-responsive pulse generator 1 arranged as illustrated by FIG. 2.

Futhermore, there may be provided an arrangement such that the display of shutter time is effected by the binary counter 2 through a decoder.

In addition to having the photo-responsive pulse generator be adapted to apply pulses by the number inversely proportional to light intensity of an object to be photographed as in the embodiment described above, the lens aperture adjustment may be effectively accomplished also with the photo-responsive pulse generator being adapted to apply pulses by the number directly proportional to light intensity of an object to be photographed. In such a case, the diaphragm driving circuit 7 closes the diaphragm 8 with application of the portion of pulses in excess of the maximum value while the diaphragm driving circuit 18 opens the diaphragm 8 with application of the portion of pulses that is short with respect to the minimum value.

FIG. 3 illustrates an embodiment of the present invention wherein the adjusting device as illustrated by FIG. 1 is combined with an electric shutter of internal light measuring type. A comparison pulse oscillator 30 operates to start applying pulses in synchronization with starting of the leading curtain of shutter. As to its internal construction, this comparison pulse oscillator may be an ordinary pulse oscillator. A binary counter 31 counts pulses applied from said comparison pulse oscillator 30. A coincidence circuit 32 provides a true output when the two binary counters 2 and 31 coincide with each other and this coincidence circuit may be arranged in well known manner. A switching transistor 33 is turned on upon application of the true output from said coincidence circuit 32 and in response excites an electromagnet which, in turn, releases the follower curtain shutter. In this embodiment, the pulses applied from the comparison pulse oscillator 30 in synchronization with starting of the leading curtain of shutter is released at a moment when the counting value of the binary counter 31 coincides with the counting value of the other binary counter 2. The shutter time thus depends upon the counting value of the binary counter 2.

FIG. 4 illustrates another embodiment of the present invention also in the form of the adjusting device of FIG. 1 combined with another type of electric shutter. A reversible counter 36 receives the pulses from the photo-responsive pulse generator 1 as addition input and receives the pulses from the comparison pulse oscillator 30 as subtraction input. An electric circuit 37 provides a true output when the counting value of the reversible counter 36 returns to 0 and this circuit may be, for example, a NOR gate. When the pulses applied from the comparison pulse oscillator 30 are applied as the subtraction pulses in synchronization with starting of the leading curtain of shutter, in this embodiment, the transistor 33 is turned ON when the number of said pulses reaches the number of pulses stored in the reversible counter 36 and thereby the follower curtain of shutter is released.

There have already been well known the electric shutters of various types other than those as illustrated by FIGS. 3 and 4, wherein the number of pulses depending upon light intensity of an object to be photographed are counted and the shutter time is controlled according to the counting value, and it is possible to select a suitable manner for continuing lens aperture adjusting device according to the present invention with any one of these electric shutters. The electric shutter circuit as illustrated by FIG. 5, for example, comprises a binary counter 38, a single pulse generator 39 and an AND gate 40. In this circuit for electric shutter, the photo-responsive pulses are applied through an OR gate 41 to the binary counter 38 which, in turn, counts the number of these pulses, and then the pulse from the single pulse generator 39 comprising, for example, a monostable multivibrator is applied to each bit stage of the binary counter 38 to reverse the output "0" or "1" of each bit stage. When the comparison pulses are applied through the OR gate 41 in synchronization with opening of the shutter, every bit stage of the binary counter 38 provides the output "1" at the moment when the number of comparison pulses coincides with the number of stored pulses, and the AND gate 40 provides the output by which the shutter closure is effected. The electric shutter circuit of FIG. 6 comprises a counter circuit 42 adapted to be applied with the photo-responsive pulses, a decoder 43, switching transistors 44a, 44b, 44c, . . . adapted to be selectively turned by the output from the decoder 43 ON, timer resistances 45a, 45b, 45c, . . ., a timer capacitor 46 and the other elements. One of said resistances is selected depending upon the counting value of the counter circuit 42 and a shutter time is determined by time constants of the selected resistance and the capacitor 46. Reference numeral 47 designates a switch adapted to be closed in synchronization with the shutter opening In addition to having the number of pulses applied from the photo-responsive pulse generator be either directly or inversely proportional to light intensity of an object to be photographed in the embodiments as described hereinabove, the present invention may also be effectively realized by an arrangement such that the number of pulses applied from said photo-responsive pulse generator is either directly or inversely proportional to logarithmically converted light intensity of an object to be photographed. The diaphragm driving circuits 7 and 18 may be conveniently arranged rather when the number of pulses is adapted to be directly or inversely proportional to light intensity of an object to be photographed, since the number of pulses then varies in arithmetic progression as light intensity of an object to be photographed varies in a series of multiples. To obtain the number of pulses directly or indirectly proportional to logarithmically converted light intensity of an object to be photographed, there may be provided an electric circuit, for example, the electric circuit as illustrated by FIG. 24 and this electric circuit may employ a log-compression diode in the place of the resistance 25.

In combination of the lens aperture adjusting device in which the number of pulses thus proportional to logarithmically converted light intensity of an object to be photographed is counted by the counter circuit with the electric shutter circuit adapted to generate the comparison pulses as illustrated by FIGS. 3, 4 or 5, the comparison pulse oscillator 30 should be an oscillator adapted to apply log-expanded pulses rather than a simple pulse oscillator. This is so because the number of pulses to be stored in the counter circuit is directly or inversely proportional to logarithmically converted light intensity of an object to be photographed.

Assuming, for example, that the number of pulses applied from the photo-responsive pulse generator varies at the ratio of one pulse to light intensity of an object to be photographed of 1 LV, the number of pulses generated from the comparison pulse oscillator may be arranged as illustrated by FIG. 7, wherein a time from the moment of shutter opening to each pulse is successively doubled. These pulses are obtained from the comparison pulse oscillator comprising, as illustrated by FIG. 8, an ordinary pulse oscillator 48 adapted to begin to apply pulses of a predetermined period in synchronization with the shutter opening and a pulse selector 49 adapted to select a $2^n$th pulse from pulses applied by said pulse oscillator 48. FIG. 9 illustrates a specific embodiment of the pulse selector 49, in which reference numeral 50 designates a binary counter, reference numerals 50a, 50b, 50c, . . . designate respective bit stages of said binary counter 50, reference numerals 51a, 51b, 51c, . . . designate SCRs serving as switching elements adapted to be applied with the outputs from the respective bit stages and reference numeral 52 designates an OR gate. As the pulses from the pulse oscillator 48 are applied to said binary counter 50, each bit stage 50a, 50b, 50c, . . . provides a binary output and the SCR 51a is turned ON with the first input pulse, the SCR 51b is turned ON with the second input pulse and the SCR 51c is turned ON with the fourth input pulse. Now a differentiation circuit associated with each SCR successively picks a differential pulse from the OR gate 52.

Assuming that the number of pulses applied from the photo-responsive pulse generator varies at the ratio of n pulses to light intensity of an object to be photographed of 1 LV, instead of said ratio of one pulse to light intensity of 1 LV, the number of pulses generated from the comparison pulse oscillator may be arranged so that the period is prolonged every n pulses. If, for example, the photo-responsive pulse generator generates five pulses for each 1 LV change in light intensity of an object to be photographed, so that five pulses correspond to the shutter time of 1/1000 sec., ten pulses correspond to the shutter time of 1/500 sec., the manner of pulse generation may be arranged so that the period is doubled every five pulses, namely, that a time from the shutter opening to the fifth comparison pulse is 1/500 sec. and a time from the shutter opening to the fifteenth comparison pulse is 1/250 sec., as illustrated by FIG. 10. These pulses are provided, for example, by the comparison pulse oscillator as illustrated by FIG. 11. Reference numeral 53 designates an ordinary pulse oscillator adapted to begin to apply pulses in synchronization with the shutter opening and reference numeral 54 designates a frequency divider adapted to frequency-divide the pulses from said pulse oscillator 53. Said frequency divider 54 may comprise, for example, multistage-connected flip-flops. Reference numeral 55 designates a counter adapted to count pulses from the frequency divider 54 and this counter 55 is reset when the counting value reaches a predetermined value and then applies a reset pulse to a ring counter 56. This ring counter 56 presents the output "1" only at a stage 56a in the beginning and such an output condition successively transfers to the following stages with application of every pulse from the counter 55. Reference numerals 57a, 57b, 57c, . . . designate AND gates and only the one of these AND gates that is applied with the output of said ring counter 56 passes the pulses from the pulse oscillator 53. Now the manner in which this comparison pulse oscillator operates will be described on the assumption that said counter 55 is reset by five input pulses. The first stage 56a of the ring counter 56 is in state of output "1" and the AND gate 57a is open at first so that the pulses from the pulse oscillator 53 are applied through said gate 57a to the first stage 54a of the frequency divider 54. Accordingly, the frequency division ratio corresponds to 1 and the pulses are directly passed without being frequency divided. As the pulses thus passed amount to five, the counter 55 is reset and a reset pulse is applied to the ring counter 56. Then, the next stage 56b comes into the state of output "1" but the AND gate 57a remains open, and the sixth and the following ones of the pulses from the pulse oscillator 53 are also applied through this AND gate 57a to the frequency divider 54. The counter 55 is reset again upon counting five pulses and a reset pulse therefrom brings about the state 56c of the ring counter 56 into the state of output "1". Now the eleventh and the following ones of the pulses from the pulse oscillator 53 are applied through the AND gate 57b to the second stage 54b of the frequency divider 54. Accordingly, the frequency division ratio increases to 2 and the pulses of which the period now prolonged double are applied from the frequency divider 54. So on the pulses are applied at the period as doubled every predetermined number of pulses.

According to the embodiment as illustrated by FIGS. 1, 3 and 4, when the number of pulses applied from the photoresponsive pulse generator is more than the predetermined maximum value for the counter circuit, only the number of pulses contained in the portion of pulses in excess of the maximum value that have actually been used for the lens aperture adjustment is not applied to said counter circuit, while, when said number of pulses is fewer than the predetermined minimum value for the counter circuit, the portion of pulses that is short with respect to said minimum value is additionally generated and only the number of pulses contained in said portion of pulses that have actually been used for the lens aperture adjustment is applied to the counter circuit. Accordingly, the shutter time corresponds to the lens aperture value after adjustment and it is not necessary to reset and then to reactivate the photo-responsive pulse generator and the counter circuit in order to store the shutter time corresponding to the lens aperture value after adjustment. Thus the time loss and the complexity in arrangement for restorage may be effectively avoided when the digital display of the shutter time based on the counting value of the counter circuit or the shutter time control based on the counting value of the counter circuit is desired.

FIGS. 12 to 23 illustrate embodiments of the present invention in which there are provided a first shift register for storage of the number of photo-responsive pulses and a second shift register for storage of a signal at a reference position so that the lens aperture may be adjusted on the basis of comparison of the signals stored in said two shift registers.

FIG. 12 illustrates an embodiment of the present invention is which a lens aperture adjustment occurs when light intensity of an object to be photographed is unacceptably low. Referring to the same figure, reference numeral 58 designates a photo-responsive pulse generator and the number of pulses to be generated is inversely proportional to the logarithmically converted light intensity of the object to be photographed. The number of pulses varies, accordingly, in an arithmetic progression with respect to the light intensity of the object to be photographed which varies in a series of multiples. It is obvious from the inverse proportion relationship that higher the light intensity of an object to be photographed is, fewer the number of pulses is and vice versa. Reference numeral 59 designates a signal generator such as a monostable multitype generator. Reference numeral 60 designates a shift register so arranged that this register is applied with the photo-responsive pulses from said photo-responsive pulse generator 58 as the shift pulses, shifts the signal provided from the signal generator 59 to the position in accordance with the number of said shift pulses and stores this signal at this position. Reference numeral 61 designates another shift register adapted to store the signal provided from another signal generator 62 being similar to said signal generator 59 at its reference position. Reference numeral 63 designates a reference pulse oscillator which may be an ordinary pulse oscillator such as that of self-oscillation multi-type and this oscillator is adapted to generate additional shift pulses to be applied to said two shift registers 60, 61 after the signals have been stored therein, respectively. This reference pulse oscillator 63 may be arranged to be manually started or may be subjected to control of a timer so as to be automatically started after elapsing of a time required for storage of signals into the shift registers 60, 61. Reference numeral 64 designates an OR gate. Reference numeral 65 designates a detector adapted to detect the sequence and the intervals at which the signal arrives at a given position (the rightmost storage stage 60a or 61a as shown) of each shift register. More specifically, this detector 65 detects which of the two shift registers got the signal at a given position earlier than the other shift register and what an interval after which the signal has arrived at the given position 61a in the shift register 61, assumed that the signal arrived at the given position 60a in the shift register 60 earlier than in said shift register 61. This detector 65 comprises inhibition gates 66, 67 SCR 68 adapted to be turned ON with output of said inhibition gate 66, SCR 69 adapted to be turned ON with output of said inhibition gate 67 and an inhibition gate 70 adapted to pass the pulses from the reference pulse oscillator 63 when there is an output provided from SCR 68 but no output provided from SCR 69. Reference numeral 71 designates an electric circuit adapted to drive a diaphragm 8 in accordance with the number of pulses provided from the detector 65 of the arrangement as previously mentioned. Now, the manner in which this embodiment operates will be described. After regulation of the diaphragm 8 to a desired value, the photo-responsive pulse generator 58 and the signal generator 59 are activated. The signal "1" provided from the signal generator 59 is stored at the position in the shift register 60, said position depending upon the number of photo-responsive pulses. Simultaneously, also the signal generator 62 operates and the output "1" therefrom is stored at the reference position of the shift register 61. Assume now that the light intensity of an object to be photographed is unacceptably low, the signal in the shift register 60 is at the right hand with respect to the signal position of the shift register 61. After the signals have respectively been stored thus in the two shift registers, the reference pulse oscillator 63 is activated so that the additional shift pulses are applied to the shift registers 60, 61. Now the two signals shift rightward as seen in the figure. As one additional shift pulse is input, the signal in each shift register rightward shifts by one storage stage. As a result, the storage stage 60a in the shift register 60 obtains the output "1" while the storage stage 61 a in the shift register 61 remains "0". Now the inhibition gate 66 provides output and thereby turns SCR 68 ON. The inhibition gate 70 is opened, allowing the pulses from the reference pulse oscillator 63 to pass therethrough. Upon application of the second one of additional shift pulses to each shift register, output of the storage stage 60a becomes "0" and output of the storage stage 61a remains "0". The inhibition gate 66 has now no output but the inhibition gate 70 remains open under the holding effect of SCR 68. Upon application of the third one of additional shift pulses, the signal arrives at the storage stage 61a in the shift register 61 and, as a result, output of the stage 61a becomes "1". The inhibition gate 70 is closed, preventing the pulses from the pulse generator 63 from passing therethrough. The number of pulses which have passed through the inhibition gate 70 corresponds to the interval from the moment at which the signal has arrived at the storage stage 60a in the shift register 60 to the moment at which the signal arrives at the storage stage 61a in the shift register 61. The diaphragm driving circuit 71 adapted to be applied with these pulses which have thus passed through said gate 70 opens the diaphragm 8 to an extent depending upon the number of these pulses. The lens aperture is thus adjusted by a desired extent when the light intensity of an object to be photographed is lower than a certain reference value. With the light intensity of an object to be photographed being acceptably high, the signal in the shift register 60 occupies the position opposed to the reference position in the shift register 61 or on the left hand with respect to said reference position as seen in FIG. 12. When the signal has been stored in the shift register 60, for example, at the position opposed to the reference position in the shift register 61, the signal simultaneously arrives at the given positions 60a, 61a, respectively, after the additional shift pulses have been applied and the signals have respectively been shifted. Accordingly, the inhibition gate 70 remains closed since the inhibition gate 66 provides no output. Also when the signal has been stored in the shift register 60 at the position on left hand with respect to the reference position in the shift register 61 as seen in Figure, the inhibition gate 67 provides output earlier than the inhibition gate 66 upon application of the additional shift pulses. Consequently, SCR 69 is turned ON and the inhibition gate 70 is closed, so that the diaphragm driving circuit 71 is applied with no pulse. In this manner, no adjustment of the lens aperture occurs when the light intensity of the object to be photographed is higher than a certain reference value. Accordingly to the embodiment as described above, the lens aperture is automatically adjusted by a desired extent in the case where the light intensity of an object to be photographed is unacceptably low and apt to be influenced by a hand trembling.

FIG. 13 illustrates an embodiment of the present invention similar to that as illustrated by FIG. 12 except that, in this embodiment, the direction in which the signal is shifted by the additional shift pulses differs from the direction in which the signal is shifted by the photoresponsive pulses. Accordingly, there is provided a shift register 72 consisting of a reversible shift register. A detector 73 is reversely arranged relative to said detector 65 so that, the signal in the shift register 61 arrives at a given position 61b earlier and thereafter the signal in the shift register 72 arrives at a given position 72b, the pulses from the pulse generator 63 may pass therethrough depending upon the interval between these arrivals. In this embodiment, when the photo-responsive pulse generator 58 and the signal generator 59 are activated for a light intensity of an object to be photographed being unacceptably low, the signal "1" provided from the signal generator 59 rightward shifts in the shift register 72 and is stored at the position as illustrated, said position being determined by the number of photo-responsive pulses. It is obviously understood that the signal is simultaneously stored at reference position in the shift register 61. Then the pulse oscillator 63 is activated to provide additional shift pulses and thereby the signals in the shift registers 72, 61 are shifted leftward as seen in FIG. 13. The inhibition gates 67, 66 provide output in this order and the pulses from the pulse oscillator 63, depending upon the interval between output provision of said two inhibition gates, pass through the inhibition gate 70 to activate the diaphragm driving circuit 71. In this manner, the lens aperture adjustment is possible also in the case where the direction in which the signal is shifted by the photoresponsive pulses is reverse with respect to the direction in which the signal is shifted by the additional shift pulses in operation of signal storage.

Figure 14:
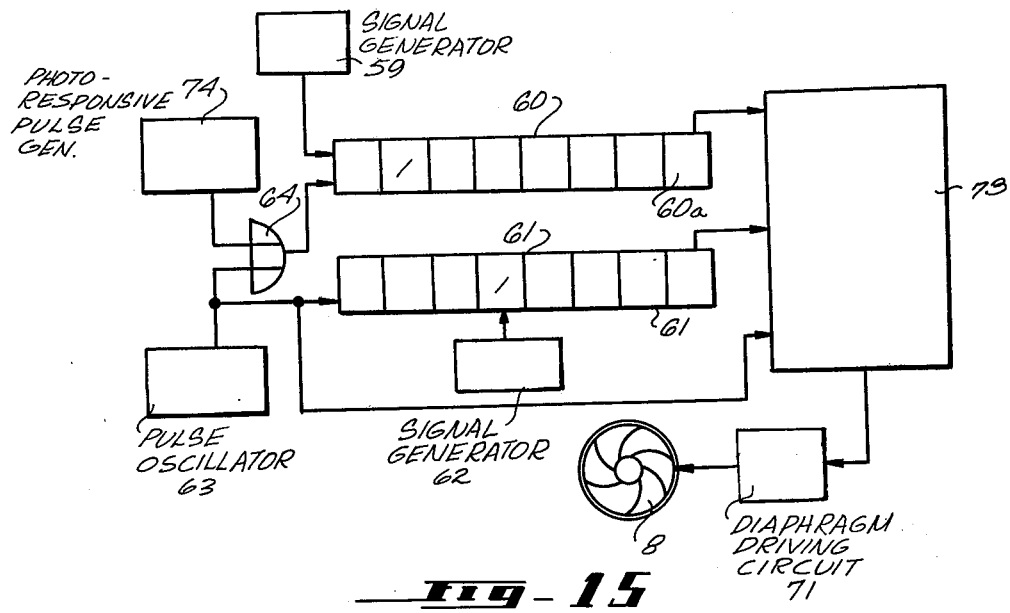

FIG. 14 illustrates an embodiment of the present invention similar to the two embodiments as mentioned above except that, in this embodiment, a photo-responsive pulse generator 74 is adapted to provide pulses by the number proportional to the logarithmically converted light intensity of an object to be photographed. Thus, the higher the light intensity of an object to be photographed, the greater the number of pulses and vice versa. There is provided a design such that the signal is stored in the shift register 60 at the position on left hand with respect to the reference position in the shift register 61 when the light intensity of an object to be photographed is unacceptably low. As the detector, the detector 73 as previously mentioned in connection with FIG. 13 may be employed to detect the interval from the moment at which the signal has arrived at a given position in the shift register 61 to the moment at which the signal arrives at a given position in the shift register 60.

It should be noted here that said arrangement is possible such that the direction of signal shift by the photo-responsive pulses differs from the direction of signal shift by the additional shift pulses as illustrated by FIG. 13 even when the photo-responsive pulse generator 74 is employed. In this case, the shift register 60 may be replaced by the reversible shift register 72 and the detector 65 as illustrated by FIG. 12 may be employed as the detector.

FIG. 15 illustrates an embodiment of the present invention in which the operation of lens aperture adjustment is stopped when the lens aperture value reaches a predetermined value during operation of lens aperture adjustment for the light intensity of an object to be photographed is unacceptably low. The lens aperture adjustment in such a case is effected in the direction of diaphragm opening and the depth of an object to be photographed is correspondingly reduced. The feature of this embodiment such that the operation of lens aperture adjustment is stopped when the lens aperture value reaches a predetermined value is to prevent said object depth from being excessively reduced. A diaphragm ring 8 adapted to be driven by the diaphragm driving circuit 71 carries a switch contact 8a which is connected to a power source E. Reference numeral 75 designates a set ring carrying a switch contact 75a through which the source voltage is applied to a display member 76 to put this on and to close an inhibition gate 78. In this embodiment, the set ring 75 is set to the maximum lens aperture value which is allowed and the diaphragm ring 8 is set to a desired value. As the contact 8a comes into contact with the contact 75a in the course of rotation of the diaphragm ring 8 by the output from the diaphragm driving circuit 71, the display member 76 is lit, indicating this to the photographer, and the inhibition gate 78 is closed. The diaphragm ring 8 thus ceases to rotate. Such an arrangement may prevent the depth of an object to be photographed from being excessively reduced against the photographer's intention.

Figure 16:
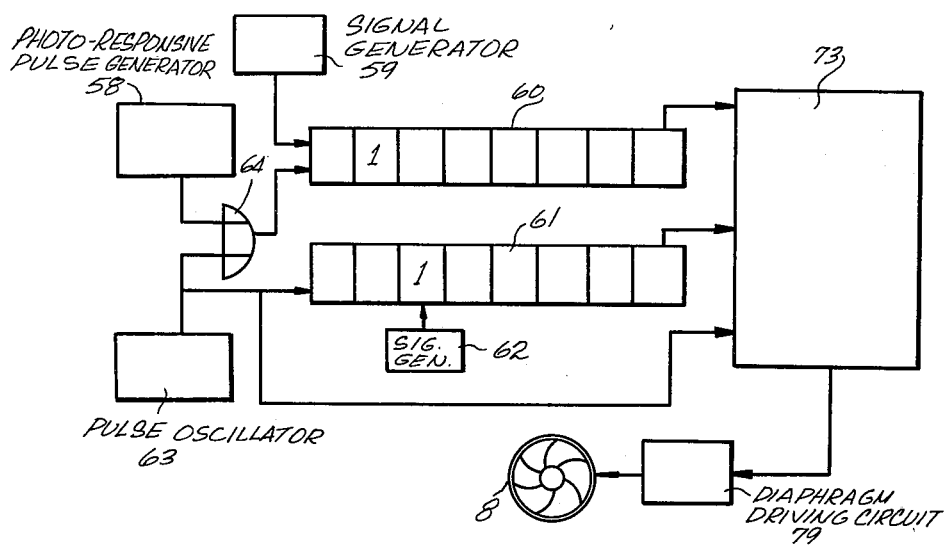

FIG. 16 illustrates an embodiment of the present invention which is different from the embodiments as mentioned hereinabove in that the lens aperture adjustment occurs when the light intensity of an object to be photographed is unacceptably high. When said photoresponsive pulse generator 58 of inverse proportion type is employed as the photo-responsive pulse generator, the reference position in the shift register 61 is appropriately selected, said detector 73 is employed as the detector and the diaphragm driving circuit 79 is adapted to close the diaphragm to effect the desired lens aperture adjustment. The manner in which the respective circuits operate will be easily understood without description in detail. It is also obvious that, just as previously mentioned in reference with FIGS. 13 and 14, the photo-responsive pulse generator 58, 74, the shift registers 60, 72 and the detectors 73, 65 may be combined as the particular case demands.

Figure 17:
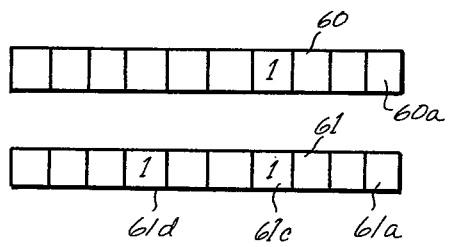
Figure 18:
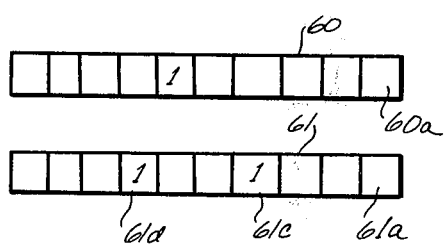
Figure 19:
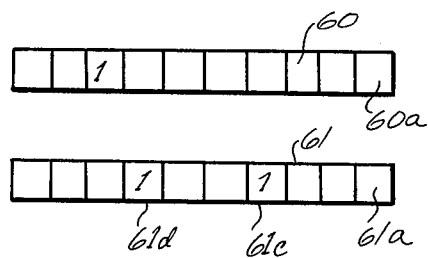
Figure 20:
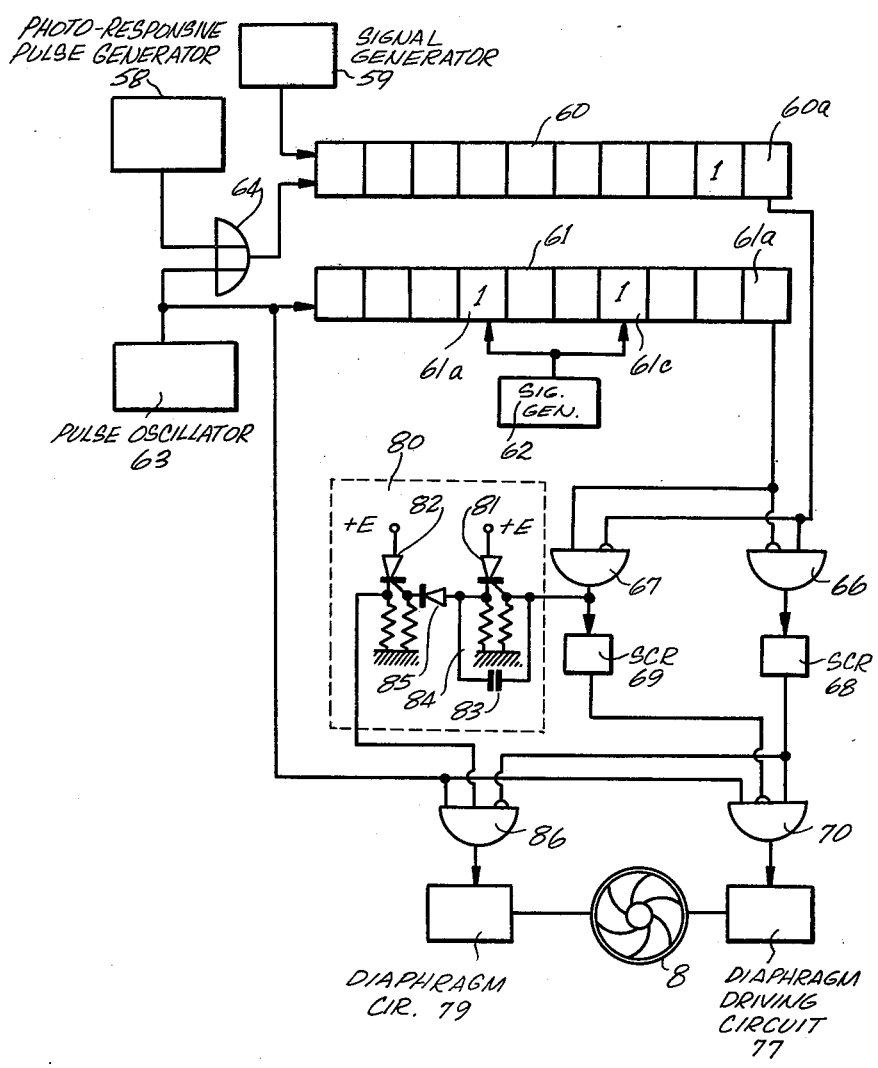

FIG. 20 illustrates an embodiment of the present invention in which the lens aperture adjustment occurs not only when the light intensity of an object to be photographed is unacceptably low but also when unacceptably high. In this figure, the shift register 61 is adapted to have the signal stored at two reference positions 61c and 61d. The position 61c is determined in accordance with the shutter time as long as possible to be free from an influence of hand trembling and the position 61d is determined in accordance with the highest shutter speed of a photographic camera. Reference numerals 68, 69 designate SCR circuits as previously mentioned, respectively, as shown by boxes in FIG. 20. Reference numeral 80 designates a counter adapted to provide output only upon application with two pulses from the inhibition gate 67. Reference numerals 81, 82 designate SCRs, and reference numeral 85 designates a diode adapted to become conductive upon application of voltage lower than a predetermined value. More specifically, this diode becomes conductive upon application with the sum of a bias voltage appearing in a cathode resistance 84 of SCR 81 and an input pulse voltage applied through a capacitor 83. Accordingly, SCR 81 is turned ON by the first pulse and SCR 82 is turned ON by the second pulse. This counter 80 may be a binary counter of 2 bit type. Reference numeral 86 designates an inhibition gate allowing the pulses from the pulse oscillator 63 when the counter 80 provides output and SCR circuit 68 provides no output. The manner in which this embodiment operates will be now described. After the diaphragm 8 has been set to a desired value, the photoresponsive pulse generator 58 and the signal generator 59 are activated and thereby the signal is stored in the shift register 60. Simultaneously, the signal generator 62 also is activated and thereby the signal is stored in the shift register 61 at the reference positions 61c, 61d. When the light intensity of an object to be photographed is unacceptably low, the signal position in the shift register 60 is on the right hand with respect to the signal position 61c in the shift register 61 as illustrated. Then, the reference pulse oscillator 63 is activated to apply additional pulses to the shift registers 60, 61 and these additional pulses shift the signals rightward in the respective shift registers 60, 61, respectively. The signal reaches a given position 60a in the shift register 60 earlier and the inhibition gate 66 provides output. As a result, SCR circuit 68 also provides output. Consequently, the inhibition gate 70 is opened and the inhibition gate 86 is closed. As the inhibition gate 70 is thus opened, the pulses from the reference pulse oscillator 63 passes through said inhibition gate 70 to the diaphragm driving circuit 71 which, in turn, opens the diaphragm 8. Then, the signal stored in the shift register 61 at the position 61c arrives at a given position 61a and the inhibition gate 67 provides output, upon application of which SCR circuit 69 also provides output to close the inhibition gate 70. The pulses from the reference pulse generator 63 are accordingly intercepted and the diaphragm 8 ceases to be opened. Although the output from said inhibition gate 67 is applied also to the counter 80, this results in turning only SCR 81 ON. As the signal stored in the shift register 61 at the position 61d arrives at the position 61a, the inhibition gate 67 provides output again, but no influence thereof occurs, since SCR 69 continues to provide output under its holding effect. The output provided again from the inhibition gate 67 is applied through the capacitor 83 to the diode 85 which has already been biased under effect of SCR 81 being turned ON and thus said diode 85 becomes conductive and SCR 82 is turned ON. This ON output is applied to the inhibition gate 86 but the pulses from the reference pulse generator 63 cannot pass through said inhibition gate 86, since said inhibition gate 86 is held by the output from SCR circuit 68 closed as previously mentioned. In such a manner, the diaphragm 8 is opened according to the interval from the moment at which the signal has arrived at a given position 60a in the shift register 60 to the moment at which the first signal arrives at a given position 61a in the shift register 61. When light intensity of an object to be photographed is acceptable, the signal stored in the shift register 60 occupies the position opposed to the reference position 61c or 61d in the shift register 61 as illustrated by FIG. 17 or lying between the two reference positions in the shift register 61 as illustrated by FIG. 18. If the additional shift pulses are applied to the shift registers in which the signals have been stored as illustrated by FIG. 17, the signals simultaneously arrive at the given position 60a, 60a, so that the inhibition gates 66, 67 provide no output. Then the signal stored in the shift register 61 at the position 61d arrives at the position 61a and the inhibition gate 67 now provides output. Although SCR circuit 69 also provides output, this has no influence since said output is not the signal adapted to open the inhibition gate 70. The same output is applied also to the counter 80 but this turns only SCR 81 ON. Also when the signal has been stored in the shift register 60 at the position opposed to the reference position 61d in the shift register 61, the inhibition gates 70, 86 are never opened. If the additional shift pulses are applied to the shift registers in which the signals have been stored as illustrated by FIG. 18, the signal stored in the shift register 61 at the position 61c arrives at the given position 61a first, then the signal stored in the shift register 60 arrives at the given position 60a and finally the signal stored in the shift register 61 at the position 61d arrives at the given position 61a. Accordingly, the inhibition gate 67 provides output first, then the inhibition gate 66 provides output and finally the inhibition gate 67 provides output again. With the first output from the inhibition gate 67, SCR 81 is turned ON. Simultaneously, SCR circuit 69 also is turned ON to close the inhibition gate 70. With the output from the inhibition gate 66, SCR circuit 68 is turned ON to close the inhibition gate 86 and the output is applied to the inhibition gate 70, but this inhibition gate 70 is held by the output from SCR circuit 69 closed. When the output is provided again from the inhibition gate 67, the inhibition gate 86 remains closed because of the output of SCR 68. In the situation in which the signal in the shift register 60 occupies the position opposed to the reference position 61c or 61d or lying between these two reference positions in the shift register 61, namely, for light intensity of an object to be photographed being acceptable, no lens aperture adjustment occurs. For light intensity of an object to be photographed being unacceptably high, the signal in the shift register 60 is stored at the position on left side with respect to the reference position 61d in the shift register 61 as illustrated by FIG. 19. Application of additional shift pulses in such a situation causes the signal stored in the shift register 61 at the position 61c to arrive at the given position 61a, first, and the inhibition gate 67 provides output with which SCR 81 and SCR circuit 69 are turned ON. As a result, the inhibition gate 70 is closed. Then, the signal stored in the shift register 61 at the position 61d arrives at the given position 61a and the inhibition gate 67 provides output again. SCR 82 is turned by this output and opens the inhibition gate 86. Thus the inhibition gate 86 is kept open to pass the pulses from the reference pulse generator 63 therethrough for the period from the moment at which the signal stored in the shift register 61 at the position 61d has arrived at the given position 61a to the moment at which the signal in the shift register 60 arrives at the given position 60a. According to the number of pulses which have thus passed through said inhibition gate 86, the diaphragm driving circuit 79 operates to close the diaphragm 8 by a desired extent. In this embodiment, the diaphragm is automatically opened when light intensity of an object to be photographed is unacceptably low and the diaphragm is automatically closed when light intensity of an object to be photographed is unacceptably high. It is obviously possible also in this embodiment that a photo-responsive pulse generator of direct proportion type may be employed or there may be provided an arrangement such that the direction in which the signal is shifted by the additional shift pulses in the shift register 60 differs from the direction in which the signal is shifted by the photo-responsive pulses in the same shift register.

FIG. 21 illustrates an embodiment of the present invention in which the lens aperture adjustment occurs both when light intensity of an object to be photographed is unacceptably low and when light intensity of an object to be photographed is unacceptably high. For comparison, the embodiment of FIG. 20 should be referred to here again. In the embodiment illustrated by FIG. 20, the direction in which the signal is shifted by the additional shift pulses is constant, no matter whether the signal in the shift register 60 occupies the position on the right or left hand with respect to the reference positions 61c, 61d of the shift register 61, so that detection of the signal sequence to effect the lens aperture adjustment of two types, namely, opening and closing of the diaphragm, is somewhat complicated and requires additional means such as a counter 80. According to the present embodiment, there is provided an improvement such that, when a signal has been stored in the shift register adapted to be applied with the photo-responsive pulses the direction in which the signal is shifted by the additional shift pulses depends on the storage position of said signal. This improvement facilitates detection of the signal sequence. To effect this, both shift registers 72, 87 comprise reversible shift registers. When the signal occupies any one of the storage stages within a right half as seen in the figure of the shift register 72, the output of this shift register is applied through an OR gate 88, a switch 89 and an SCR circuit 90 similar to the previously mentioned one to a gate 91 to open this AND gate 91 so that the pulses from the reference pulse oscillator 6 may be applied as additional shift pulses to the shift registers 72, 87. These additional shift pulses shift the signals rightward as seen in the figure in the shift registers 72, 87. Similarly, when the signal occupies any one of the storage stages in a left half as seen in the figure of the shift register 72, the output of this shift register is applied through an OR gate 92, the switch 89 and an SCR circuit 93 to a gate 94 to open this AND gate 94. The pulses from the reference pulse generator 63 pass through said opened gate 94 and are applied as additional shift pulses to the shift registers 72, 87 to shift the signals leftward as seen in the figure. It should be noted here that the boundary along which the shift register 72 is divided by the OR gates 88, 92 may be between the reference positions 87c and 87d of the shift register 87. To detect the sequence and the interval in and at which the signals arrive at the respective one given position 72a, 87a in the respective shift registers 72, 87, there is provided the detector 65 the output of which activates the diaphragm driving circuit 71. Similarly, to detect the sequence and the interval in and at which the signals arrive at the other given positions 72b, 87b in the respective shift registers 72, 87, there is provided the separate detector 65 the output of which activates the diaphragm closing circuit 79. In this embodiment, the photo-responsive pulse generator 58 and the signal generator 69 are activated to store the signal in the shift register 72 and also the signal generator 62 is activated to store the signal in the reference position 87c or 87d of the shift register 87. After these signals have been stored, the switch 89 is closed. When the signal has been stored in any one of the storage stages in the right half as seen in the figure of the shift register 72, the "1" signal thereof is applied through the OR gate 88 and the switch 89 to the SCR circuit 90 to turn this SCR circuit 90 ON. Upon this turning ON, the gate 91 is opened. When the reference pulse oscillator 63 is activated, the additional shift pulses are applied through the gate 91 to the shift registers 72, 87 to shift the signals stored therein rightward as seen in the figure. Assume now that the signal has been stored in the shift register 72 at a position on right hand with respect to the reference position 87c in the shift register 87, the detector 65 is activated to operate the diaphragm driving circuit 71, as previously mentioned. Assume that the signal has been stored in the shift register 72 at any one of the storage stages in the left half as seen in the figure, "1" signal therefrom is applied through the OR gate 92, the switch 89 and the SCR circuit 95 to the gate 94 to open this gate 94. The additional shift pulses are then applied through said gate 94 to the shift registers 72, 87 to shift the signals stored therein leftward as seen in the figure. Assume that the signal has been stored in the shift register at a position on the left side with respect to the reference position 87d in the shift register 87, the detector 65 is activated to operate the diaphragm driving circuit 79.

FIG. 22 illustrates an embodiment of the present invention in which the display member is lit when the signal has been stored in the shift register 60 adapted to be applied with the photo-responsive shift pulses and occupies a position opposed to the reference position or on the left hand as seen in the figure with respect to said reference position in the shift register 62. When light intensity of an object to be photographed is acceptable, no lens aperture adjustment is required and the signal is stored in the shift register 60 at a position opposed to the left side as seen in the figure of the reference position. When the signal has been stored within this range, "1" signal is applied through an OR gate 95 and a switch 96 adapted to be closed after completion of this storage to an SCR 97 to turn said SCR 97 ON and to put a display member 98 on. Observing this display member 98 being lit, the photographer may effectively make a shutter release without activating the reference pulse oscillator 63. It is obvious that, with an arrangement in which the reference pulse generator 63 may be started under control of a timer, the reference pulse oscillator 63 is prevented by output of the SCR 97 from being activated. When light intensity of an object to be photographed is unacceptably low, the signal stored in the shift register 60 occupies a position on the right hand, as seen in the figure of the reference position, so that the display member 98 is not lit even when the switch 96 is closed after completion of storage. Now the photographer may start the reference pulse oscillator 63. Reference numeral 99 designates an AND gate adapted to provide output when the diaphragm 8 has been opened to the maximum value in spite of a presence of the pulse output from the detector 65 to turn an SCR 100 ON and to put the display member 101 ON. The state of the diaphragm 8 being opened to the maximum value may be detected also by an arrangement comprising the diaphragm ring 8 as illustrated by FIG. 15 provided with a switch contact. Said lighting of the display member 101 makes the photographer know that a preferable shutter time for photographing is not still reached even though the diaphragm 8 has been opened to the maximum value. This embodiment corresponds to the embodiment of FIG. 1 to which the OR gate 95 to the display member 98 and the AND gate 99 to the display member 101 are added and the embodiments of FIGS. 13 to 21 also may be arranged in this manner. This embodiment provides a high efficiency, since there may be provided an arrangement such that the additional shift pulses are applied only when the adjustment is necessary.

FIG. 23 illustrates a combination of the embodiment as illustrated by FIG. 12 with an electric shutter of inner photometric type. The pulse oscillator 63 is put under control of a timer 102 adapted to determine the moment at which the pulse oscillator 63 starts to operate and of another timer 103 adapted to determine the moment at which the pulse oscillator 63 ceases to operate. The timer 103 is adapted to activate the photo-responsive pulse generator 58 and the signal generator 59 at the moment at which said timer 103 stops operation of the pulse oscillator 63. Reference numeral 30 designates said comparison pulse oscillator under control of a timer 104. Reference numeral 31 designates said binary counter. Reference numeral 105 designates AND gate to provide a shutter closing signal on the basis of output comparison between the respective storage stages of the shift register 60 and the binary counter 31. Reference numeral 106 designates an OR gate. Now the manner in which this embodiment operates will be described. The photo-responsive pulse generator 58 and the signal generators 59, 62 are activated to store the signals in the shift registers 60, 61. Then the detector 65 is activated to adjust the diaphragm 8. Upon elapsing of a sufficient time in which the signal stored in the shift register 60 shifts from the leftmost storage stage to the rightmost storage stage as seen in the figure after the pulse oscillator 63 has started to operate, the timer 103 is activated to stop operation of the pulse oscillator 63 and to activate the photo-responsive pulse generator 58 and the signal generator 59 again. As the diaphragm 8 has been adjusted, the signal in the shift register 60 is stored at a position opposed to or on the left hand of the reference position in the shift register 61, as seen in the figure. Upon completion of this storage, the timer 104 provides the shutter opening signal and simultaneously makes the comparison pulse generator 30 start to operate. Pulses from this comparison pulse generator 30 are applied to the binary counter 31 of which the respective storage stages successively provide binary outputs. When the one of these storage stages in said binary counter 31 that corresponds to the signal storage position of the shift register 60 provides output, the corresponding one of the AND gates provides the shutter closing signal.

Each of the embodiments as illustrated by FIGS. 13 to 22 also may be combined with said electric shutter. Generally, the embodiments as illustrated by FIGS. 12 to 22 may be combined with electric shutter of the other types so far as these electric shutters are arranged so that pulses are generated by the number in accordance with logarithmically converted light intensity of an object to be photographed and stored in the shift registers.

FIG. 24 illustrates a specific embodiment of the photo-responsive pulse generator 58 adapted to generate pulses by the number inversely proportional to logarithmically converted light intensity of an object to be photographed. This circuit corresponds to the circuit of FIG. 2 in which the resistance 25 is replaced by a diode 107.

The photo-responsive pulse generator 74 comprises the log-compression diode and the CdS exchanged with each other in said circuit of FIG. 24.

FIGS. 25 to 28 illustrate embodiments of the present invention in which a timer selects a time according to a counting value of a counter when said counting value deviates from a certain range and a diaphragm driving circuit is activated in accordance with said time selected by the timer. In particular, in these embodiments the timer controls the length of time during which a drive control signal is supplied to the diaphragm driving circuit.

Reference numeral 108 designates a shift register adapted to be applied with the photo-responsive pulses from said photo-responsive pulse generator 58 as shift pulses and thereby to shift a signal applied from the signal generator 59 to a position depending upon the number of said shift pulses to be stored thereat. Reference numerals 109a, 109b and 109c designate switching transistors adapted to be turned ON depending upon the position at which the signal has been stored in the shift register 108 out of the range 108a to 108b. Reference numerals 110a, 110b and 110c designate resistances respectively connected to said transistors 109a, 109b and 109c of which the resistance values are expressed by a relationship 110a < 110b < 110c. A timer circuit is constituted by one of these resistances and a capacitor 111. Reference numeral 112 designates a switching transistor adapted to be applied with the terminal voltage of the capacitor 111 and reference numeral 113 designates an electromagnet adapted to be excited upon turning ON of said transistor 112. A timer circuit is constituted by said transistors 109a, 109b and 109c, the resistances 110a, 110b and 110c, the capacitor 111, the transistor 112 and the electromagnet 113. This timer circuit gives a time depending upon the position at which the signal has been stored in the shift register 108. Reference numerals 114 and 115 designate a variable resistance and a capacitor, respectively, forming a timer circuit, reference numeral 116 designates a transistor adapted to pick up the terminal voltage of the capacitor 115 as an emitter-follower voltage, and reference numeral 117 designates a switch adapted to be opened upon excitation of the electromagnet 113. These elements 114 to 117 form a slope voltage generator. Reference numeral 118 designates an OR circuit adapted to pick up the output from the shift register 108 when the signal has been stored in said shift register 108 at a position out of the range 108a to 108b. Reference numeral 119 designates a switch adapted, similarly to said switch 96, to be closed upon completion of signal storage in the shift register 108. Reference numeral 120 designates an AND gate through which a source voltage E is applied to said timer circuit and slope voltage generator when the OR gate 118 is in output condition and the switch 119 is in the closed state. Accordingly, said slope voltage generator starts to operate upon closure of the switch 119 with the gate 120 being opened and ceases to operate upon opening of the switch 117 due to excitation of the electromagnet 113. In consequence, the emitter-follower voltage of the transistor 116 depends upon the time given by the timer circuit. Reference numeral 121 designates a diaphragm opening circuit which opens a diaphragm ring 8 according to the emitter-follower voltage value of said transistor 116 and may be well known as a servo-motor circuit or a meter.

The slope voltage generator circuit may be one of the bootstrap type or may be replaced by a pulse oscillator and, in this case, a pulse motor, a pulse accumulator circuit or the like may be employed as the diaphragm opening circuit and the diaphragm driving circuit.

The manner in which this embodiment operates will be described. The diaphragm ring 8 is set to a desired value and the setting ring 75 is set to a value specified in view of the depth of an object to be photographed. Then, the photo-responsive pulse generator 58 and the signal generator 59 are activated. "1" signal from the signal generator 59 is stored in the shift register 108 at a position as determined depending upon the number of photo-responsive pulses. For the light intensity of an object to be photographed being acceptable, the signal is stored in the shift register 108 within the range 108a to 108b. Assume now that the signal has been stored within the range 108a to 108b, upon closure of the switches 96 and 119 after completion of this signal storage, the OR gate 95 provides output and turns the SCR 97 ON. The display member 98 is lit in this case, so that the photographer knows the light intensity being acceptable and may make a shutter release. It should be noted here that an arrangement may be provided such that the shutter release is automatically effected upon lighting of the display member 98. For the light intensity of an object to be photographed being excessively low, the signal is stored in the shift register 108 at a position on the right side of the position 108b as seen in the figure. When the switches 96 and 119 are closed in the state where the signal has been stored at the position as illustrated, the display member 98 is not lit since there is no output from the OR gate 95. On the other hand, there is output from the OR gate 118 at this moment, so that the gate 120 is opened and, as a result, the source voltage E is applied through the switch 119 and said gate 120 to the timer circuit and the slope voltage generator. Said slope voltage generator is thus activated and the emitter-follower voltage of the transistor 116 rises as the capacitor 115 is charged. Simultaneously, the transistor 109b adapted to be applied with the signal output is turned ON and the capacitor 111 begins to be charged through the resistance 110b. The diaphragm driving circuit 121 adapted to be applied with said emitter-follower voltage opens the diaphragm ring 8 which had been set to a desired value as the voltage rises. After the time given by the timer according to the values of the resistance 110b and the capacitor 111 has elapsed; the switching transistor 112 is turned ON and excites the electromagnet 113. The switch 117 is then opened and the emitter-follower voltage ceases to rise. The diaphragm is thus opened to the extent enough to provide an acceptable light intensity of an object to be photographed. When the lens aperture value reaches a predetermined value during operation of opening the diaphragm ring 8, the switch contacts 8a and 75a are brought into contact to light the display member 76 and to stop operation of the diaphragm driving circuit 121, so that the diaphragm ring 8 is not further rotated.

FIG. 26 illustrates an embodiment of the present invention so arranged that the lens aperture is adjusted in the direction of diaphragm opening for an excessively low light intensity of an object to be photographed and in the direction of diaphragm closing for, on the contrary, an excessively high light intensity of an object to be photographed. According to this embodiment, the signal is stored in the shift register 108 at a position within the range 108a to 108b for an acceptable light intensity of an object to be photographed, at a position on the right side of position 108b as seen in the figure for an excessively low light intensity of an object to be photographed and at a position on left side of the position 108a as seen in the figure for an excessively high light intensity of an object to be photographed. It is desired, accordingly, to determine the position 108a depending upon the highest shutter speed of used photographic camera and the position 108b depending upon, as in the previously mentioned embodiment, the critical shutter speed for the influence of hand trembling. This embodiment is similar to the previously mentioned embodiment in that, when the signal has been stored at a position on the right side of the position 108b, one of the switching transistors 109a, 109b and 109c depending upon the storage position is turned ON to select one of the resistances 110a, 110b and 110c. The resistance values are given in the order of 110a < 110b < 110c. Similarly, when the signal has been stored at a position on left side of the position 108a, one of the switching transistors 109d, 109e and 109f depending upon the storage position is turned ON to select one of the resistances 110d, 110e and 110f (110d < 110e < 110f). The emitter-follower output from the transistor 116 is applied through an AND gate 122 to the diaphragm driving circuit 121 and through a gate 123 to a diaphragm driving circuit 124. The gate 122 is adapted to be opened when the OR gate 118 is in output condition and the gate 123 is adapted to be opened when an OR gate 125 is in output condition. The diaphragm driving circuit 124 is similar to the diaphragm driving circuit 121 except that the former is adapted to close the diaphragm and the latter is adapted to open the diaphragm. The manner in which this embodiment operates will be now described. The diaphragm ring 8 is set to a desired value. Then the photo-responsive pulse generator 58 and the signal generator 59 are activated to store a signal in the shift register 108. Assume now that the light intensity of an object to be photographed is acceptable and the signal has been stored at a position within the range 108a to 108b, the display member 98 is lit upon closure of the switches 96 and 119 after completion of signal storage, informing the photographer that photographing may be immediately started by the photographer. The slope voltage generator is activated upon closure of the switch 119 and the emitter-follower voltage from the transistor 116 is applied toward the gates 122 and 123 but cannot pass these gates since there is no output from the OR gates 118 and 125. Assume that the light intensity of an object to be photographed is excessively low and the signal has been stored at a position on the right side of the position 108b as seen in the figure, such as the position as illustrated, the switching transistor 109a is turned ON upon closure of the switches 96 and 119 and the capacitor 111 begins to be charged through the resistance 110a. At the same time, the slope voltage generator also is activated and the voltage thereof is applied through the gate 122 which is, in turn, now opened by the output applied from the OR gate 118 to the diaphragm driving circuit 121 to activate it. When the slope voltage generator ceases to operate after elapsing of the time given by the timer according to the values of the resistance 110a and the capacitor 111, the diaphragm ring 8 also is stopped. Also when the light intensity of an object to be photographed is excessively high and the signal has been stored at a position on left side of the position 108a as seen in the figure, a time is similarly given by the timer to activate the diaphragm driving circuit 124. According to this embodiment, it will be understood from the aforegoing description that, for an excessively low light intensity of an object to be photographed, a time is given by the timer in accordance with a degree of darkness and the diaphragm is opened to an extent according to said time. Thus the influence of hand trembling is eliminated. For an excessively high light intensity of an object to be photographed, on the contrary, the diaphragm is closed in accordance with a degree of this excessiveness and thereby an overexposure is avoided. It should be noted here that there may be provided the setting 75 as employed in the embodiment of FIG. 5 in this embodiment also.

FIG. 27 illustrates an embodiment of the present invention comprising a combination of the embodiment of FIG. 26 and an electric shutter. The shift register 108 serves as a memory not only for the electric shutter itself but also for lens aperture adjusting device. A circuit as designated by a block A includes a timer circuit and a slope voltage generator circuit both similar to those as illustrated by FIG. 26. Reference numeral 126 designates a timer adapted to activate the photo-responsive pulse generator 58 and the signal generator 59 again. Output from the timer 126 is applied through an AND gate 127 to the photo-responsive pulse generator 58 and the signal generator 59 and serves to reset the shift register 108. The AND gate 127 is adapted to be opened upon turning ON of an SCR 128 which is, in turn, adapted to be turned ON upon application of the output from the OR gate 118 or 125 through an OR gate 130 and a switch 129 which is adapted to be closed upon completion of the signal storage. Reference numeral 131 designates a timer adapted to be applied with the output from the timer 126 and to be activated to light a display member 132 upon completion of the signal re-storage in the shift register 108 caused by reactivation of the photo-responsive pulse generator 58 and the signal generator 59.

In this embodiment, upon depression of the release button, the photo-responsive pulse generator 58 and the signal generator 59 are activated at the first half of said depression and a signal is stored in the shift register 108. For an acceptable light intensity of an object to be photographed, the signal is stored at a position within the range 108a to 108b. Upon closure of the switches 96, 119 and 129 after completion of this signal storage, the SCR 97 is turned ON to light the display member 98. Upon further depression of the release button by the photographer, the switch 133 is closed simultaneously with opening of the shutter and the pulses are successively applied from the comparison pulse oscillator 30 to the binary counter 31. Thus the storage stage of the binary counter 31 that corresponds to the signal storage position in the shift register 108 provides output and the corresponding AND gate provides a shutter closing signal which is, in turn, applied through the OR gate 106 to the shutter closing circuit (not shown). For an excessively high or low light intensity of an object to be photographed, the signal is stored at a position on the left side of the position 108a or on the right side of the position 108b, respectively. Upon closure of the switches 96, 119 and 129 after completion of this signal storage, the diaphragm ring 8 is adjusted in the manner or order as previously mentioned. Simultaneously, the output from the OR gate 118 or 125 is applied through the OR gate 130 and the switch 129 to the SCR 128 to turn this SCR 128 ON. Upon turning ON of the SCR 128, the gate 127 is opened. The timer 126 is activated after completion of adjustment of the diaphragm ring 8 to reset the shift register 108 and to activate the photo-responsive pulse generator 58 and the signal generator 59 again. In consequence, the signal is stored at a position based on the adjusted lens aperture value. This storage position, after adjustment, is not necessarily within the range 108a to 108b, since there may occur a case where no acceptable light intensity is obtained even though the diaphragm ring 8 has been fully rotated for an excessively high or low light intensity of an object to be photographed. After completion of this restorage, the timer is activated to light the display member 132. Upon further depression of the release button, the switch 133 is closed simultaneously with opening of the shutter and thereafter a shutter closing signal is obtained in the manner as previously mentioned. It is also possible in this embodiment that a signal which indicates completion of adjustment of the diaphragm ring 8 is detected and this signal is not only applied to the gate 127 but also utilized as a reset signal, instead of providing the timer 126. Furthermore, there may be provided an arrangement such that the shutter opening is automatically effected upon lighting of the display members 98, 132.

In the embodiments as described hereinabove with reference to FIGS. 25 to 27, the photo-responsive pulse generator 58 generates pulses by the number depending upon logarithmically converted light intensity of an object to be photographed and these photo-responsive pulses are applied to the shift register 108 as the shift pulses so that said light intensity is stored in the shift register 108. However, there are many other methods by which the light intensity of an object to be photographed is stored in the shift register 108 and one of these methods in which the photo-responsive pulses are applied not as the shift pulses is illustrated by FIG. 28. Referring to FIG. 28, reference numeral 1 designates a photo-responsive pulse generator which is different from said photo-responsive pulse generator 58, namely, not of log-compressive type. Reference numeral 134 designates a binary counter adapted to count the photo-responsive pulses from said photo-responsive pulse generator 1. Reference numeral 135 designates gates each adapted to be opened upon application of the pulse from a single pulse generator 137. The single pulse generator 137 may be, for example, a monostable multivibrator. The respective AND gates 135 correspond to the respective storage stages of the binary counter 134 so that the output of each storage stage is directly applied to the corresponding gate but the output of each storage stage posterior to the storage stage which corresponds to the gate to be applied with said output is reversed by the associated NOT gate 136 before applied to said gate. Each output from each gate 135 is stored in the shift register 108 at the respective position. The components such as the timer circuit adapted to be applied with the output from the shift register 108 are not shown. Now the manner in which the circuit of FIG. 28 operates will be described. When the photo-responsive pulse generator 1 is activated, the photo-responsive pulses are applied to the binary counter 134 and stored therein. Assume that the number of photo-responsive pulses is, for example, five, the outputs of the binary counter 134 at the respective storage stages are as illustrated. After completion of storage in the binary counter 59, the single pulse generator 137 is activated to open each of the gates 135. Such an output from each of the gates 135 establishes a storage state of the shift register 108 as illustrated. Thus the signal storage position in the shift register 108 corresponds to the storage stage at which the photo-responsive pulses arrive in the binary counter 134 or the most significant position of the count value by the binary counter 134. It will be understood that the method in which the pulses are applied to the shift register as the shift pulses by the number depending upon light intensity of an object to be photographed and only the signal corresponding to the most significant position of the count value by the binary counter is stored in the shift register 108 at the corresponding position.

FIGS. 29 and 30 illustrate an embodiment of the present invention in which the number of pulses generated in accordance with light intensity of an object to be photographed is stored in a counter circuit, a shutter time is controlled according to the digital output from said counter circuit, said digital output being converted into coarser digital output, and the lens aperture is adjusted by the output thus converted. Referring to FIG. 29, a photo-responsive pulse oscillator 1, binary counters 2, 31, a comparison pulse oscillator 30, a coincidence circuit 32, an SCR 138 serving as a switching element and an electromagnet 34 constitute an electric shutter circuit similar to that as illustrated by FIG. 3. Said binary counter 2 is to store a shutter time and the number of bits of said binary counter 2 is selected according to the range of shutter time to be stored. Assume that said range of shutter time lies, for example, between 1/4000 to 15 sec., the number of bit stages will be in order of 17 bit stages. For convenience of illustration, this embodiment is shown as having 7 bits therein. Furthermore, this embodiment is arranged so that the number of counted pulses is 16 (i.e., only the bit stage 2a provides the output "1") for the shutter time of 1/30 sec. and the counting values higher than 16 corresponding to said shutter time of 1/30 sec. is defined as the range in which the resulting photograph is influenced by hand trembling. Reference numeral 139 designates a digital output converter circuit consisting of an AND gate 140 and a NOT gate 141. An output terminal 142 provides a signal "1" when the bit stage 2b provides the output "1" and the bit stages 2b and 2c provide the output "0", an output terminal 143 provides a signal "1" when the bit stage 2b provides the output "1" and the bit stage 2c provides the output "0", and an output terminal 144 provides a signal "1" when the bit stage 2c provides the output "1". Thus the signal "1" is provided from the output terminal 142 when the counting value of the binary counter 2 lies between 16 and 31, from the output terminal 143 when between 32 and 63, and from the output terminal 144 when between 64 and 127. Accordingly, said digital output converter circuit 139 detects digital output corresponding to the counting value of 16 to 127 as grouped in three stages. Reference numerals 145, 146 and 147 designate switching transistors adapted to be selectively turned ON by the output from said digital output converter circuit 139. Reference numerals 148, 149, 150, 151, 152 and 153 designate resistance which constitute a digital-analog converter circuit adapted to generate voltage of different levels according to the output from the output terminal 142, 143 or 144. To effect this, different values are allotted to said resistances 148 to 153. Reference numeral 154 designates a servo-motor circuit to drive a diaphragm ring 8 to an extent according to the level of voltage generated from said resistances. More specifically, this servo-motor circuit 154 opens the diaphragm ring 8 to an extent corresponding to 1 LV when the switching transistor 145 is turned ON, to an extent corresponding to 2 LV when the switching transistor 146 is turned ON and to an extent corresponding to 3 LV when the switching transistor 147 is turned ON. The elements 8a and 75a are inserted through brushes 8b and 75b, respectively, into the circuit. Reference numeral 155 designates an OR gate adapted to be applied with output from one of the output terminals 142, 143 and 144, reference numeral 156 designates a switching transistor and reference numeral 157 designates a display member adapted to warn the photographer that the shutter time lies within the range in which the resulting photograph is influenced by hand trembling. Reference numeral 158 designates a switch adapted to be closed upon excitation of the electromagnet 159 included in said timer circuit and to energize the switching transistors 145, 146 and 147 from a power source upon completion of storage operation of the binary counter 2. So far as said storage operation of the binary counter 2 has not been completed, therefore, the digital output thereof is varying and there occurs no erroneous operation of the servo-motor circuit 154 by this output.

Now the manner in which this embodiment operates will be described. The diaphragm ring 8 is set to a desired value and thereby the variable resistance 27 is also varied in operative association therewith to reckon the lens aperture value. Upon depression of a release button, the photoresponsive pulse oscillator 1 is connected to the power source at the first half stage of this depression and pulses are applied to the binary counter 2 in which these pulses are counted. After a certain time period has elapsed, the switching transistor 160 is turned ON and the switch 161 is opened by this transistor, so that oscillation of pulses is stopped. At the same time, the switch 158 is closed and, as a result, the transistors 145, 146 and 147 are connected to the power source. When the counting value of the binary counter 2 is lower than 15, i.e., the shutter time is shorter than 1/30 sec., all the bit stages 2a, 2b and 2c provide the output "0". The output terminals 142, 143 and 144 of the digital output converter circuit 139 also provide the output "0", accordingly, so that the display member 157 is not lit and the servo-motor circuit 154 also is not activated. Upon depression of the release button to the final stage, the shutter opens and simultaneously the pulse oscillator 30 begins to apply the comparison pulses. When the counting value of the binary counter 31 coincides with the counting value of the binary counter 2, the coincidence circuit 32 provides output which, in turn, puts the SCR 138 ON and thereby excites the electromagnet 34 for shutter closure.

Then, the case where the counting value of the binary counter 2 is higher than 16 will be considered. When the counting value of the binary counter 2 lies in the range between 16 and 31 (corresponding to the shutter time of 1/30 to 1/15 sec.), the output terminal 142 provides the output "1" and thereby the switching transistor 145 is turned ON, transmitting the voltage divided by the resistances 148 and 149 to the servo-motor circuit 154. Consequently, the diaphragm ring 8 is rotated by the amount corresponding to 1 LV to open the diaphragm. Simultaneously, the switching transistor 156 also is turned ON and the display member 157 is lit to warn the photographer that there may occur influence of hand trembling. Now, the photographer may return the release button to reset the components such as the photoresponsive pulse oscillator 1 and the binary counter 2 as the case demands. When the release button is depressed again, pulses are applied to and counted by the binary counter 2 under an adjusted lens aperture value. The diaphragm has been opened by an extent corresponding to 1 LV and the counting value is now lower than 15. Accordingly, depression of the release button to the final stage effects opening and closure of the shutter in the manner as previously mentioned.

For the counting value of the binary counter 2 lying within the range between 32 and 63 (corresponding to the shutter time of 1/15 to approximately 1/8 sec.), the switching transistor 146 is turned ON and the diaphragm ring 8 is rotated by an amount corresponding to 2 LV. Subsequent operations including the oscillator resetting and the shutter opening and closure also occur in the previously mentioned manner. Also for the counting value of 64 to 127, the diaphragm ring 8 is rotated by the extent corresponding to 3 LV.

It will be understood from the aforegoing description that, in accordance with the present embodiment, the lens aperture is stepwise adjusted according to the counting value of the binary counter 2, i.e., 1 LV by 1 LV adjusted in the manner of 1 LV, 2 LV, 3 LV, . . ..

FIG. 30 illustrates an embodiment of the present invention in which the lens aperture is automatically adjusted when the critical values for overexposure and hand trembling are excessed. Elements 1, 30, 36, 34 and 138 constitute an electric shutter circuit similar to that as illustrated by FIG. 4.

In said reversible counter 36, the counting value higher than 127 is defined as the range of hand trembling and the counting value lower than 3 is defined as the range of overexposure. The highest shutter time of this photographic camera is assumed here as 1/1000 sec. Accordingly, the output terminal 142 of the digital output converter circuit 139 provides "1" signal for the counting value of 128 to 255 (corresponding to the shutter time of 1/15 to 1/8 sec.). Reference numeral 162 designates a switch adapted to vary the critical value for hand trembling and opening of this switch reduces said critical value for hand trembling by an amount corresponding to 1 LV. When the counting value is 1 (corresponding to the shutter time of 1/4000 sec.), the output terminal 163 provides "1" signal and, when the counting value is 2 to 3 (corresponding to the shutter time of 1/4000 to 1/1000 sec.), the output terminal 164 provides "1" signal. This means that the digital output for the counting value of 1 to 3 is grouped in two steps. Reference numerals 165 and 166 designate switching transistors adapted to be selectively turned ON by the output from said digital output converter circuit and reference numerals 167, 168, 169 and 170 designate resistances. These elements 165 to 170 form a D-A converter circuit. Reference numeral 171 designates a servo-motor circuit adapted to close the diaphragm ring 8 by an amount corresponding to 1 LV when the switching transistor 165 is turned ON and by an amount corresponding to 2 LV when the switching transistor 166 is turned ON. Reference numeral 174 designates a switching transistor adapted to be turned ON upon application through an OR gate 172 and a switch 173 with output of the output terminals 163 or 164, and reference numeral 175 designates a display member used to warn the photographer of an overexposure. Said switch 173 and another switch 176 are provided, as the switch 158, to be closed upon excitation of the electromagnet 159 (FIG. 29) included in the photo-responsive pulse oscillator 1 and to activate the servo-motor circuit 171 and the display member 175 after counting of the reversible counter 36 has been completed. In this embodiment, no lens aperture adjustment occurs when the counting value of the reversible counter 36 is 4 to 127. For the counting value higher than 127, the diaphragm is stepwise, i.e., by 1 LV, 2 LV, . . . opened depending upon the extent to which the counting value is in excess of the threshold value for hand trembling. For the counting value lower than 3, on the other hand, the diaphragm is stepwise, i.e., by 1 LV, 2 LV, . . . closed depending upon the extent to which the counting value is short with respect to the threshold value for overexposure. The photographer who is skilled sufficiently to obtain an acceptable photograph even with a lower threshold value of 1/15 sec. may open the switch 162 so that no opening adjustment of the diaphragm occurs unless the counting value excesses 255. After completion of the lens aperture adjustment, the release button is restored and the photoresponsive pulse oscillator 1 as well as the reversible counter are reset. Upon depression of the release button again the pulses are applied to an counted by the reversible counter 36 under the adjusted lens aperture value. Upon depression of the release button to the final stage, the pulses applied from the pulse oscillator 30 in synchronization with shutter opening are applied to the subtraction input of the reversible counter 36 and the shutter closure is effected when the counting value of the reversible counter 36 returns to 0.

Although this embodiment has been described as arranged in the manner that the digital output from the counter circuit is detected every 1 LV and the amount of lens aperture value adjustment also corresponds thereto, said digital output may be detected, for example, every 0.5 LV. Furthermore, the lens aperture is automatically adjusted by a desired amount. The arrangement peculiar to the present invention such that the digital output of the memory circuit is converted once into a coarser digital output and the lens aperture is adjusted according to the converted output is advantageous in that the precision with which the shutter time is controlled is improved and the circuit arrangement may be simplified since the lens aperture is adjusted at a suitable interval (e.g., every 1 LV) and the adjustment is effected without provision of inconveniently fine steps.

It will be understood from the aforegoing description that, according to the present invention, an appropriate exposure may be obtained even for the light intensity of an object to be photographed which is unacceptably so high that the shutter release even at the highest shutter time would result in overexposure, since the lens aperture is automatically reduced. For the light intensity of an object to be photographed so low that the photographing result may be affected by hand trembling, the lens aperture is enlarged to provide a shutter time free from any influence of hand trembling. There may be provided an arrangement such that this operation of diaphragm opening is stopped when the lens aperture value reaches a predetermined value during said operation of diaphragm opening and, accordingly, an excessive reduction of the depth of an object to be photographed may be effectively avoided.

The present invention may be applied to both through-the-maximum-aperture light measuring system and through-the-minimum-aperture light measuring system.

What is claimed is:

1. In a camera having a shutter operated in an automatic manner for controlling exposure time, and having a diaphragm with an adjustable opening; a camera exposure control system for automatically changing the setting of the diaphragm opening from a manual presetting thereof, which comprises:
   a photo-responsive pulse generator means for producing in serial-by-bit format a number of data pulses as a function of the light intensity of the object to be photographed and the manual presetting of the diaphragm opening;
   register means for storing in parallel-by-bit format, a digital signal to identify one of a sequence of register means memory states;
   means responsive to the serially produced data pulses for sequencing the register means through its memory states so that a first predetermined number of said data pulses are required to sequence the register means to a first predetermined one of said memory states and a second, larger predetermined number of said data pulses are required to sequence the register means to a second predetermined one of said memory states;
   diaphragm driving circuit means, including an electromechanical element, for adjusting the diaphragm opening in response to a drive control signal supplied thereto; and
   drive control signal supplying means responsive to said digital signal for supplying the drive control signal to the diaphragm driving circuit means to cause it to adjust the diaphragm opening to an extent dependent upon the difference between the number of said serially produced data pulses and one of said predetermined number of data pulses.

2. A system according to claim 1, wherein the driving circuit means includes means adapting it to respond to drive pulses serving as the drive control signal, and wherein the drive control signal supplying means includes drive pulse supplying means for supplying a selected number of drive pulses to serve as the drive control signal.

3. A system according to claim 2, wherein the photo-responsive pulse generator means includes circuit means for causing the number of data pulses produced by the photoresponsive pulse generator means to decrease as a function of increasing light intensity, wherein the diaphragm driving circuit means comprises first and second circuits each having its own input for receiving drive pulses, the first circuit for causing the diaphragm opening to increase and the second circuit for causing the diaphragm opening to decrease, and wherein the drive pulse supplying means includes first gating means for supplying drive pulses to the input of the first circuit when the number of data pulses exceeds the second predetermined number, and includes second gating means for supplying drive pulses to the input of the second circuit when the number of data pulses is fewer than the first predetermined number.

4. A system according to claim 3, wherein the second gating means includes a decoder responsive to the register means for producing a gating control signal when, after the last of the data pulses in the serial-by-bit format number of pulses has occurred, the register means has not been sequenced to its first predetermined memory state, and further includes pulse generating means responsive to the gating control signal for supplying the drive pulses to the second circuit.

5. A system according to claim 3, wherein a counting circuit serves as the register means and counts pulses gated to it so that the counting circuit accumulates a count serving as the digital signal with the digital signal representing exposure time in binary-coded format, and with the second predetermined state representing an exposure time beyond which will likely lead to blurring of the photograph; and wherein gating means serves as the means for sequencing the register means, the gating means being activated when the counting circuit is sequenced to the second predetermined state, and, when activated, gating successive data pulses as drive pulses to the input of the first circuit.

6. A system according to claim 5, wherein gating circuit means provide for selectively coupling the data pulses produced by the photo-responsive pulse generator means to the counter circuit to be counted thereby, the gating circuit means being inhibited from so coupling the data pulses to the photo-responsive pulse generator means while the successive data pulses are being gated to the first circuit.

7. A system according to claim 2, wherein the photo-responsive pulse generator means includes circuit means for causing the number of data pulses produced by the photo-responsive pulse generator means to increase as a function of increasing lighting intensity, wherein the diaphragm driving circuit means comprises first and second circuits each having its own input for receiving drive pulses, the first circuit for causing the diaphragm opening to increase and the second circuit for causing the diaphragm opening to decrease, and wherein the drive pulse supplying means includes first gating means for supplying drive pulses to the input of the first circuit when the number of data pulses is fewer than the first predetermined number, and second gating means for supplying drive pulses to the input of the second circuit when the number of data pulses exceeds the second predetermined number.

8. A system according to claim 2, wherein the register means comprises a shift register for storing the digital signal in a format such that one stage of the shift register at a time is in a set state, and wherein the system further includes a control shift register for storing a signal at a reference position, a pulse oscillator for applying shift pulses to both of the shift registers, a detector; and wherein the diaphragm circuit means receives its drive pulses from the detector, and the commonly-shifted shift registers respond to the shift pulses from the pulse oscillator to define a sequence and an interval in accordance with the respective shifting thereof until associated stages thereof are in the set state; and the detector including means for detecting said sequence and interval to determine the number of drive pulses to supply.

9. A system according to claim 1, wherein the drive control signal supplying means includes a timer circuit for controlling the length of time during which the drive control signal is supplied, and wherein the diaphragm driving circuit means includes means for adjusting the diaphragm opening by an increasing amount as a function of an increasing length of time during which the drive control signal is supplied.

10. An exposure control system, operable to automatically change the setting of a camera lens diaphragm opening from a manual presetting thereof, for a camera having a shutter operated in an automatic manner to control exposure time, the system comprising:
a photo-responsive pulse generator for producing pulses by the number depending upon the light intensity of the object to be photographed;
a digital memory circuit for counting and storing pulses selectively coupled to it from the pulse generator; and
means, including a diaphragm driving circuit, for adjusting the diaphragm opening in accordance with the extent that the number of pulses produced by the pulse generator deviates from a predetermined range of counts of the digital memory circuit.

11. A system according to claim 10, wherein the photo-responsive pulse generator includes means for causing the number of pulses produced by the photo-responsive pulse generator to decrease as a function of increasing light intensity; wherein the diaphragm driving circuit has an input for receiving drive pulses, and responds to received drive pulses to cause the diaphragm opening to increase; and wherein the system includes gating means which, when activated, supplies the drive pulses; the gating means being activated when the number of pulses produced by the photo-responsive pulse generator and coupled to the digital memory circuit causes the digital memory circuit to count to a preselected maximum count, and the gating means, when activated, coupling the succeeding produced pulses as drive pulses and inhibiting further coupling of the produced pulses to the digital memory circuit.

12. A system according to claim 10, and further including means operable to prevent the diaphragm opening from being increased automatically beyond a preselected maximum setting even though the pulse generator continues to produce pulses, and wherein the gating means couples the pulses that continue to be produced to the digital counting circuit.

13. A system according to claim 11, wherein, in addition to said diaphragm driving circuit for causing the diaphram opening to increase, the system includes a second diaphragm driving circuit which has an input for receiving drive pulses and responds to the drive pulses it receives to cause the diaphragm opening to decrease, and wherein the system includes circuit means responsive to the digital counting circuit for generating drive pulses which are applied to the second diaphragm drive circuit when the number of pulses produced by the photo-responsive pulse generator and coupled to the digital counting circuit is fewer than a predetermined number.

14. A system according to claim 13, and further comprising means, including a comparison pulse generator activated in synchronization with the shutter opening, to provide that the shutter closing is effected when the number of pulses produced by the comparison pulse generator corresponds to the number of pulses counted by the digital counting circuit.

15. A system according to claim 10, wherein the photo-responsive pulse generator includes means for causing the number of pulses produced by the photo-responsive pulse generator to increase as a function of increasing light intensity; wherein said diaphragm driving circuit provides for decreasing the diaphragm opening when the number of pulses coupled to the digital counting circuit exceeds a predetermined number, and wherein the system includes a second diaphragm driving circuit providing for increasing the diaphragm opening when the number of pulses coupled to the digital counting circuit is fewer than a predetermined number.

16. A system according to claim 10, wherein the diaphragm driving circuit includes a pulse motor.

17. A system according to claim 10, wherein the diaphragm driving circuit includes a digital to analog converter and a servo-motor.

18. An exposure control system, operable to automatically change the setting of a camera lens diaphragm opening from a manual presetting thereof, for a camera having a shutter operated in an automatic manner to control exposure time, the system comprising:
- a photo-responsive pulse generator for producing pulses by the number depending upon the light intensity of the object to be photographed;
- a first shift register for storing a signal therein at a position depending upon the number of pulses coupled to it as shift pulses from the photo-responsive pulse generator;
- a second shift register for storing a signal therein at a reference position;
- a pulse oscillator for generating additional shift pulses which are applied to both shift registers after the signals have been stored in the shift registers, the two shift registers responding to the shift pulses from the pulse oscillator to define a sequence and an interval in accordance with the respective shifting thereof until the signals in the shift registers are shifted to associated positions in the respective shift registers;
- a detector responsive to said defined sequence for producing drive pulses; and
- means, including a diaphragm driving circuit, responsive to said drive pulses for adjusting the diaphragm opening to an extent depending upon the number of said drive pulses.

19. A system according to claim 18, wherein the first shift register includes means for shifting the signal stored therein in either direction, and wherein the direction in the signal is shifted by the additional shift pulses depends upon the position where the signal is stored when the additional shift pulses commence.

20. A system according to claim 18, and further comprising a display member, and means or causing the display member to indicate that the signal stored in the first shift register is within a preselected range of positions thereof.

21. A system according to claim 18, and further comprising means operable for preventing the diaphragm opening from being increased automatically beyond a preselected maximum setting.

22. A system according to claim 18, wherein the diaphragm driving circuit includes a pulse motor.

23. A system according to claim 18, wherein the diaphragm driving circuit includes a digital to analog converter and a servo-motor.

* * * * *

UNITED STATES PATENT AND TRADEMARK OFFICE
CERTIFICATE OF CORRECTION

PATENT NO. : 4,074,289
DATED : February 14, 1978
INVENTOR(S) : Tsukumo Nobusawa

It is certified that error appears in the above-identified patent and that said Letters Patent are hereby corrected as shown below:

In the title, "ADAPTER" should read -- ADAPTED --.
Column 1, line 41, "time" should read -- times --. Column 12, line 11, "is" should read -- in --. Column 13, line 21, "61 a" should read -- 61a --. Column 17, line 4, "60a" should read -- 61a --. Column 24, line 11, "FIG. 5" should read -- FIG. 25 --. Column 30, line 43, claim 3, "photoresponsive" should read -- photo-responsive --. Column 34, line 5, claim 18, "depending" should read -- dependent --. Column 34, line 14, claim 20, "or" should read -- for --.

Signed and Sealed this

Eleventh Day of July 1978

[SEAL]

Attest:

RUTH C. MASON
*Attesting Officer*

DONALD W. BANNER
*Commissioner of Patents and Trademarks*